US010492231B2

(12) United States Patent
Viger et al.

(10) Patent No.: US 10,492,231 B2
(45) Date of Patent: Nov. 26, 2019

(54) BACKOFF BASED SELECTION METHOD OF CHANNELS FOR DATA TRANSMISSION

(71) Applicant: CANON KABUSHIKI KAISHA, Tokyo (JP)

(72) Inventors: Pascal Viger, Janze (FR); Patrice Nezou, Saint Sulpice la Foret (FR); Romain Guignard, Rennes (FR); Stéphane Baron, Le Rheu (FR)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 15/735,091

(22) PCT Filed: Jun. 10, 2016

(86) PCT No.: PCT/EP2016/063397
§ 371 (c)(1),
(2) Date: Dec. 8, 2017

(87) PCT Pub. No.: WO2016/198669
PCT Pub. Date: Dec. 15, 2016

(65) Prior Publication Data
US 2018/0184453 A1 Jun. 28, 2018

(30) Foreign Application Priority Data

Jun. 12, 2015 (GB) .................................. 1510363.3
Sep. 1, 2015 (GB) .................................. 1515432.1

(51) Int. Cl.
*H04W 74/08* (2009.01)
*H04W 84/12* (2009.01)

(52) U.S. Cl.
CPC .......... *H04W 74/085* (2013.01); *H04W 84/12* (2013.01)

(58) Field of Classification Search
CPC ........................... H04W 74/085; H04W 84/12
See application file for complete search history.

(56) References Cited

U.S. PATENT DOCUMENTS

| | | | | |
|---|---|---|---|---|
| 2010/0135256 A1* | 6/2010 | Lee | ........................ | H04W 16/14 370/336 |
| 2011/0129201 A1* | 6/2011 | McLean | ................. | H04N 5/782 386/296 |
| 2013/0077485 A1* | 3/2013 | Bai | ..................... | H04W 74/006 370/230 |
| 2015/0124785 A1* | 5/2015 | Merlin | .................... | H04L 47/32 370/336 |
| 2015/0319747 A1* | 11/2015 | Chu | .................. | H04W 72/0406 370/330 |

* cited by examiner

*Primary Examiner* — Mohammad S Anwar
(74) *Attorney, Agent, or Firm* — Canon U.S.A., Inc. IP Division

(57) ABSTRACT

The invention relates to a method and device for sending data over a channel of a communication medium comprising a plurality of channels and which can be accessed by a plurality of nodes. Each node using a medium access mechanism with collision avoidance based on a computation of backoff values corresponding to a number of time-slots a node waits before accessing the communication medium. The method comprising the following steps performed by a first node of the plurality of nodes upon the reception of a trigger frame: obtaining a backoff counter value computed by the first node; selecting a channel among the plurality of channels based on the obtained backoff counter; and sending data on the selected channel by the first node.

19 Claims, 13 Drawing Sheets

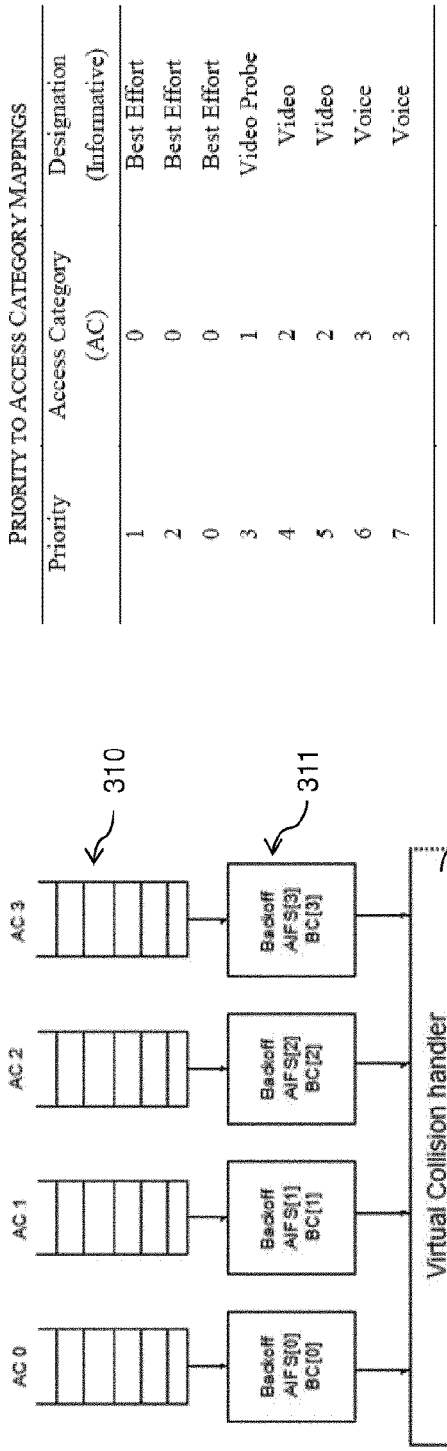
Fig. 3a
Fig. 3b
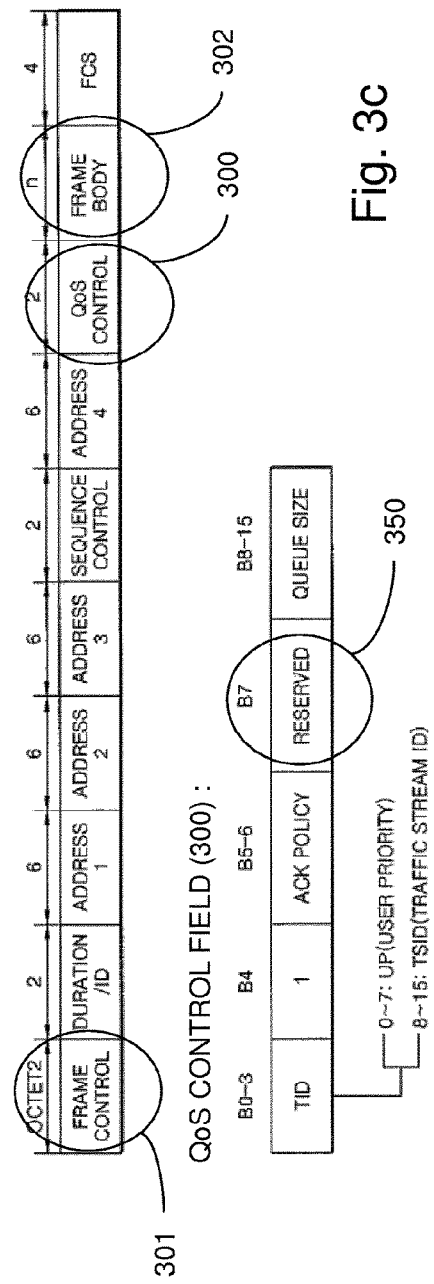
Fig. 3c

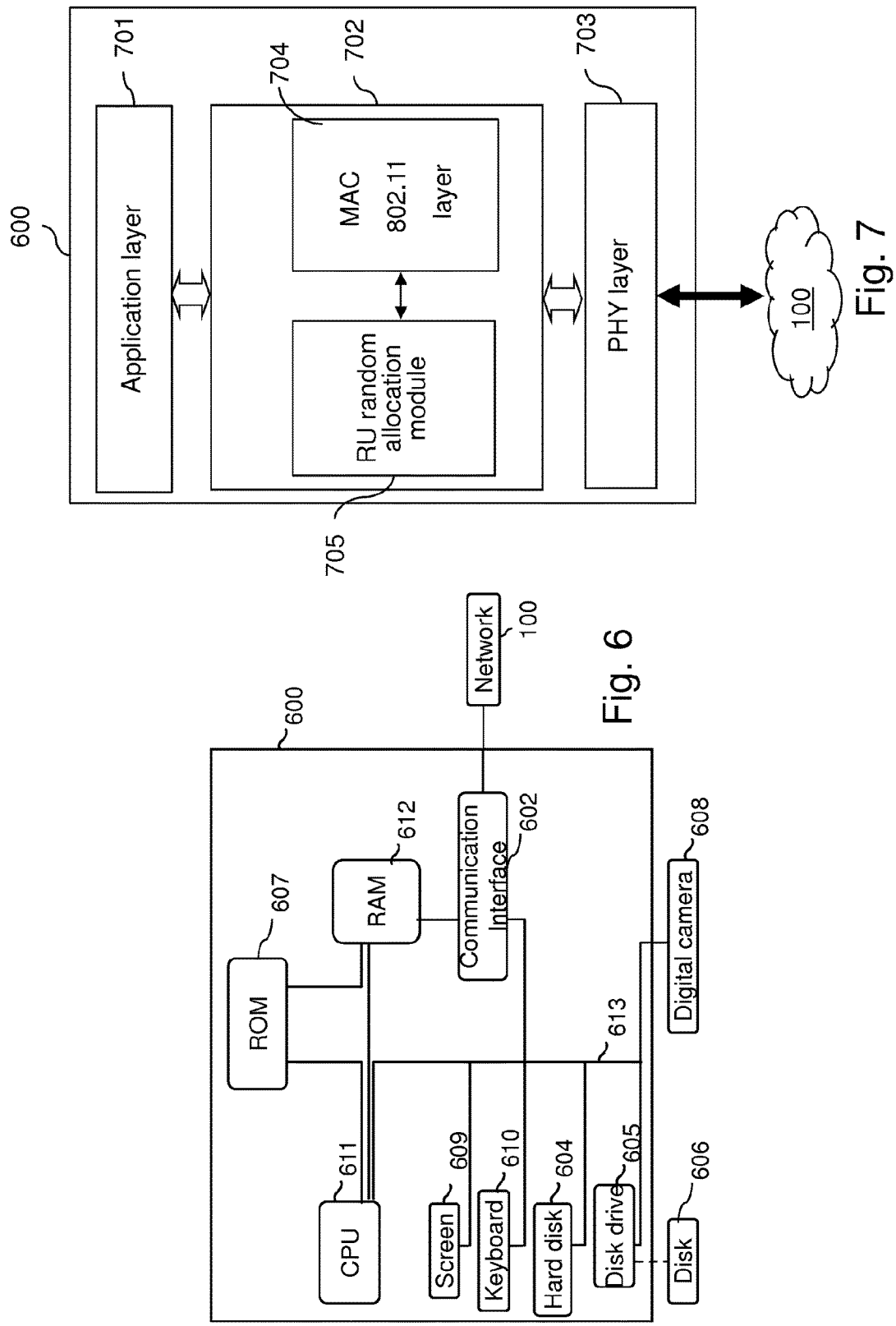

Fig. 11

| Field | Size (bytes) | Description |
|---|---|---|
| Attribute ID | 1 | Specific value identifying the type of OFDMA RU attribute (e.g. in the range 19-221). |
| Length | 2 | Length of the following fields in the attribute |
| RU_nb | 1 | Number of RUs which are available for random access — 1021 |
| RU_list | Variable | Ordered list of available RUs. The list size is given by RU_nb. — 1022 |
| Sched_RU _List | Variable | Ordered list of scheduled RUs, that are allocated to AP-associated stations (in the form <RU_index, station_AID>) — 1023 |

Attribute body

1020B

BACKOFF BASED SELECTION METHOD OF CHANNELS FOR DATA TRANSMISSION

CROSS-REFERENCE TO RELATED APPLICATIONS

The present application is a National Phase application of International Patent Application No. PCT/EP2016/063397, filed Jun. 10, 2016, entitled "BACKOFF BASED SELECTION METHOD OF CHANNELS FOR DATA TRANSMISSION", which claims priority to United Kingdom Patent Application No. 1510363.3, filed Jun. 12, 2015 and United Kingdom Patent Application No. 1515432.1, filed Aug. 1, 2015, all of which are hereby expressly incorporated by reference herein in their entirety.

FIELD OF THE INVENTION

The present invention relates generally to communication networks and more specifically to the sending of data over a channel of a communication medium comprising a plurality of channels and which can be accessed by a plurality of nodes.

BACKGROUND OF THE INVENTION

The IEEE 802.11 MAC standard family defines a way wireless local area networks (WLANs) can work at the physical and medium access control (MAC) level. Typically, the 802.11 MAC (Medium Access Control) operating mode implements the well-known Distributed Coordination Function (DCF) which relies on a contention-based mechanism based on the so-called "Carrier Sense Multiple Access with Collision Avoidance" (CSMA/CA) technique.

The 802.11 medium access protocol standard or operating mode is mainly directed to the management of communication nodes waiting for the medium to become idle so as to try to access to the medium.

The network operating mode defined by the IEEE 802.11ac standard provides very high throughput (VHT) by, among other means, moving from the 2.4 GHz band which is deemed to be highly susceptible to interference to the 5 GHz band, thereby allowing for wider frequency contiguous channels of 80 MHz, two of which may optionally be combined to get a 160 MHz composite channel as operating band of the wireless network.

The 802.11ac standard also tweaks control frames such as the Request-To-Send (RTS) and Clear-To-Send (CTS) frames to allow for composite channels of varying and predefined bandwidths of 20, 40 or 80 MHz, the composite channels being made of one or more channels that are contiguous within the operating band. The 160 MHz composite channel is possible by the combination of two 80 MHz composite channels within the 160 MHz operating band. The control frames specify the channel width (bandwidth) for the targeted composite channel.

A composite channel therefore consists of a primary channel on which a given node performs EDCA backoff procedure to access the medium, and of at least one secondary channel, of for example 20 MHz each. The primary channel is used by the communication nodes to sense whether or not the channel is idle, and the primary channel can be extended using the secondary channel or channels to form a composite channel.

Given a tree breakdown of the operating band into elementary 20 MHz channels, some secondary channels are named tertiary or quaternary channels.

In 802.11ac, all transmissions, and thus all possible composite channels, include a primary channel. This is because the nodes perform full Carrier Sense Multiple Access/ Collision Avoidance (CSMA/CA) and Network Allocation Vector (NAV) tracking on the primary channel only. The other channels are assigned as secondary channels, on which the nodes have only capability of CCA (clear channel assessment), i.e. detection of an idle or busy state/status of said secondary channel.

An issue with the use of composite channels as defined in the 802.11n or 802.11ac is that the 802.11n and 802.11ac-compliant nodes (i.e. HT nodes standing for High Throughput nodes) and the other legacy nodes (i.e. non-HT nodes compliant only with for instance 802.11a/b/g) have to coexist within the same wireless network and thus have to share the 20 MHz channels.

To cope with this issue, the 802.11n and 802.11ac standards provide the ability to duplicate control frames (e.g. RTS/CTS or CTS-to-Self) in an 802.11a legacy format (called as "non-HT") to establish a protection of the requested TXOP over the whole composite channel.

This is for any legacy 802.11a node that uses any of the 20 MHz channel involved in the composite channel to be aware of on-going communications on the 20 MHz channel used. As a result, the legacy node is prevented from initiating a new transmission until the end of the current composite channel TXOP granted to an 802.11n/ac node.

As originally proposed by 802.11n, a duplication of conventional 802.11a or "non-HT" transmission is provided to allow the two identical 20 MHz non-HT control frames to be sent simultaneously on both the primary and secondary channels forming the targeted or requested composite channel.

This approach has been widened for 802.11ac to allow duplication over the channels forming an 80 MHz or 160 MHz composite channel. In the remainder of the present document, the "duplicated non-HT frame" or "duplicated non-HT control frame" or "duplicated control frame" means that the node device duplicates the conventional or "non-HT" transmission of a given control frame over each secondary 20 MHz channel of the 40/80/160 MHz operating band.

In practice, to request a composite channel (equal to or greater than 40 MHz) for a new TXOP, an 802.11n/ac node does an EDCA backoff procedure in the primary 20 MHz channel. In parallel, it performs a channel sensing mechanism, such as a Clear-Channel-Assessment (CCA) signal detection, on the secondary channels to detect the secondary channel or channels that are idle (channel state/status is "idle") during a PIFS interval before the start of the new TXOP (i.e. before the backoff counter expires).

More recently, Institute of Electrical and Electronics Engineers (IEEE) officially approved the 802.11ax task group, as the successor of 802.11ac. The primary goal of the 802.11ax task group consists in seeking for an improvement in data speed to wireless communicating devices used in dense deployment scenarios.

In such 802.11ax research context, the need becomes apparent for enhancing the efficiency and usage of the wireless channels. Typically, the user demands are primarily related to the delivery of high-definition audio-visual real-time and interactive content in dense WLAN scenarios. It is well-known that the performance of the CSMA/CA protocol used in the IEEE 802.11 standard deteriorates rapidly as the number of stations and the amount of traffic increase.

There is thus a need to improve the communication medium access for multiple users/stations for performing transmissions, and in particular concurrent transmissions.

SUMMARY OF INVENTION

The present invention has been devised to overcome the foregoing limitations.

This invention proposes one solution based on the reuse of the backoff counter values for assigning a channel to a node of the network to send data.

According to a first aspect, the invention relates to a method of sending data over a channel of a communication medium comprising a plurality of channels and which can be accessed by a plurality of nodes, each node using a medium access mechanism with collision avoidance based on a computation of backoff values corresponding to a number of time-slots a node waits before accessing the communication medium. The method comprising the following steps performed by a first node of the plurality of nodes upon the reception of a trigger frame:

obtaining a backoff counter value computed by the first node;

selecting a channel among the plurality of channels based on the obtained backoff counter; and sending data on the selected channel by the first node.

The channels are thus selected at low implementation cost.

In one embodiment, the method further comprises a step of determining from the trigger frame the channels of the communication medium available for contention by the plurality of nodes; wherein each channel is associated with a sequence number and wherein the selected channel has an associated sequence number equal to the obtained backoff counter.

In a variant, the plurality of channels of the communication medium can be accessed simultaneously by a plurality of nodes.

In one implementation, the plurality of channels are resource units of an Orthogonal Frequency Division Multiple Access (OFDMA) scheme.

In another implementation, the plurality of channels are resource units of a Time Division Multiple Access (TDMA) scheme.

According to another aspect, the invention relates to a method of sending data over a channel of a communication medium comprising a plurality of channels and which can be accessed by a plurality of nodes, each node using a medium access mechanism with collision avoidance based on a computation of backoff values corresponding to a number of time-slots a node waits before accessing the communication medium. The method comprising the following steps performed by a first node of the plurality of nodes upon the reception of a trigger frame:

determining from the trigger frame the number of channels of the communication medium available for contention by the plurality of nodes;

comparing the computed backoff value of the first node with the number of available channels; and if the computed backoff value is not greater than the number of available channels, sending data over one of the channels of the communication medium.

In a preferred implementation, the available channels of the communication medium are sequentially numbered and wherein sending data by the first node is performed on the channel which number equals the computed backoff value.

In one implementation, the method further comprises a step of determining if the first node is eligible to contend for access on a channel based on the backoff counter value and wherein the sending of data on the selected channel is performed if the first node is determined to be eligible.

In one implementation, the trigger frame reserves a transmission opportunity on one or more channels the nodes can access using a contention scheme.

In one implementation, the channel is a resource unit resulting from the division of a 20 MHz channel into OFDMA sub-channels.

In one implementation, the trigger frame is received from the access point and wherein the data is transmitted at the sending step to the access point.

In one implementation, the method further comprises a step of indexing the plurality of channels and wherein the selecting of a channel for data transmission is derived from a mapping between backoff counter values and indexes of the plurality of channels.

According to a variant of the first aspect, the method relates to a wireless communication method in a wireless network comprising an access point and a plurality of nodes, the method comprising the following steps, at one of said nodes:

receiving a trigger frame, the trigger frame reserving at least one transmission opportunity on one or more random channels the nodes can access using a contention scheme;

obtaining a random backoff value local to the node;

selecting a random channel based on the obtained backoff counter; and transmitting data on the selected random channel during a reserved transmission opportunity.

According to another aspect, the invention relates to a communication device in a wireless network comprising an access point and a plurality of nodes, the communication device being one of the nodes and comprising:

means for receiving a trigger frame, the trigger frame reserving at least one transmission opportunity on one or more random channels the nodes can access using a contention scheme;

means for obtaining a backoff counter value computed by the node;

means for selecting a random channel among the plurality of random channels based on the obtained backoff counter; and sending data on the selected channel by the node.

According to another aspect, the invention relates to a wireless communication method in a wireless network comprising an access point and a plurality of nodes, the method comprising the following steps, at one of said nodes:

receiving a trigger frame, the trigger frame reserving a transmission opportunity on one or more random channels the nodes can access;

obtaining a random backoff value local to the node;

comparing the backoff value to a threshold value;

determining if the node is eligible to contend for access on a random channel based on the result of the comparing; and transmitting data on a random channel during the transmission opportunity if the node is determined to be eligible.

This advantageously limits the number of stations allowed to transmit on a random channel during the transmission opportunity: as a consequence, this reduces the collision probability for random onto a random channel.

In one implementation, the node is eligible to contend for access if the random backoff value is not greater than the threshold value.

In one implementation, the threshold value is based on the number of random channels the nodes can access using a contention scheme.

In one implementation, the threshold value is received from the access point. This advantageously offers a means for access point to control the contention over the random channels, by limiting/increasing the number of stations allowed to try to transmit during the transmission opportunity.

In one implementation, the threshold value is included in the trigger frame. In one implementation, the node comprises a plurality of transmission queues for serving data at different priorities.

In one implementation, the steps of obtaining a random backoff value and comparing the backoff value to a threshold value are executed for each transmission queue, and wherein a queue is eligible to serve data depending on the result of comparing the random backoff value associated with said queue with the threshold value.

In one implementation, a queue is eligible to serve data if the random backoff value associated with said queue is not greater than the threshold value.

In one implementation, the node is eligible to contend for access if at least one of its queues is eligible to serve data.

In one variant, if a plurality of queues are eligible to serve data, one queue is selected among the plurality of eligible queues for serving data to be transmitted on the random channel in the transmitting step.

In another variant, if a plurality of queues are eligible to serve data and the node is capable of transmitting data over a plurality of transmission opportunities on one or more random channels, a plurality of eligible queues are selected for serving data to be transmitted on one or more random channels in the transmitting step.

In one implementation of one of the two variants, the selection of one or a plurality of eligible queue(s) is based on the traffic priority associated with said queue or queues or on the random backoff value(s) obtained for said queue or queues.

In one implementation, the random channel on which data is transmitted is selected among a plurality of random channels the nodes can access using a contention scheme based on the obtained random backoff value.

In one implementation, the random channel is a resource unit resulting from the division of a 20 MHz channel into OFDMA sub-channels.

In one implementation, the trigger frame is received from the access point and wherein the data is transmitted at the transmitting step to the access point.

In one implementation, the random backoff value is the number of 802.11 time-slots the node must wait when a medium is sensed idle before the node grants itself a transmission opportunity (TXOP).

In one implementation, the method further comprising a step of updating a random backoff value by subtracting the number of random channels to be used for a next data transmission.

According to another aspect, the invention relates to a communication device in a wireless network comprising an access point and a plurality of nodes, the communication device being one of the nodes and comprising:

means for receiving a trigger frame, the trigger frame reserving a transmission opportunity on a random channel the nodes can access using a contention scheme;

means for obtaining a random backoff value local to the node;

means for comparing the backoff value to a threshold value;

means for determining if the node is eligible to contend for access on the random channel based on the result of the comparing; and means for transmitting data on the random channel during the transmission opportunity if the node is determined to be eligible.

The invention also relates to a wireless communication system having an access point and at least one node according to one of the above aspects.

The invention also relates in its other aspects to an apparatus and a computer program implementing the steps of the method and a non-transitory computer-readable medium storing such a program.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings.

FIGS. 3a, 3b and 3c illustrate the IEEE 802.11e EDCA involving access categories.

FIG. 6 shows a schematic representation a communication device or station in accordance with embodiments of the present invention.

FIG. 7 shows a block diagram schematically illustrating the architecture of a wireless communication device in accordance with embodiments of the present invention.

FIGS. 10 and 11 depicts the format of a 'RU Information Element', which may be used according to embodiments of the present invention.

DETAILED DESCRIPTION

The invention will now be described by means of specific non-limiting exemplary embodiments and by reference to the figures.

Figure 1:
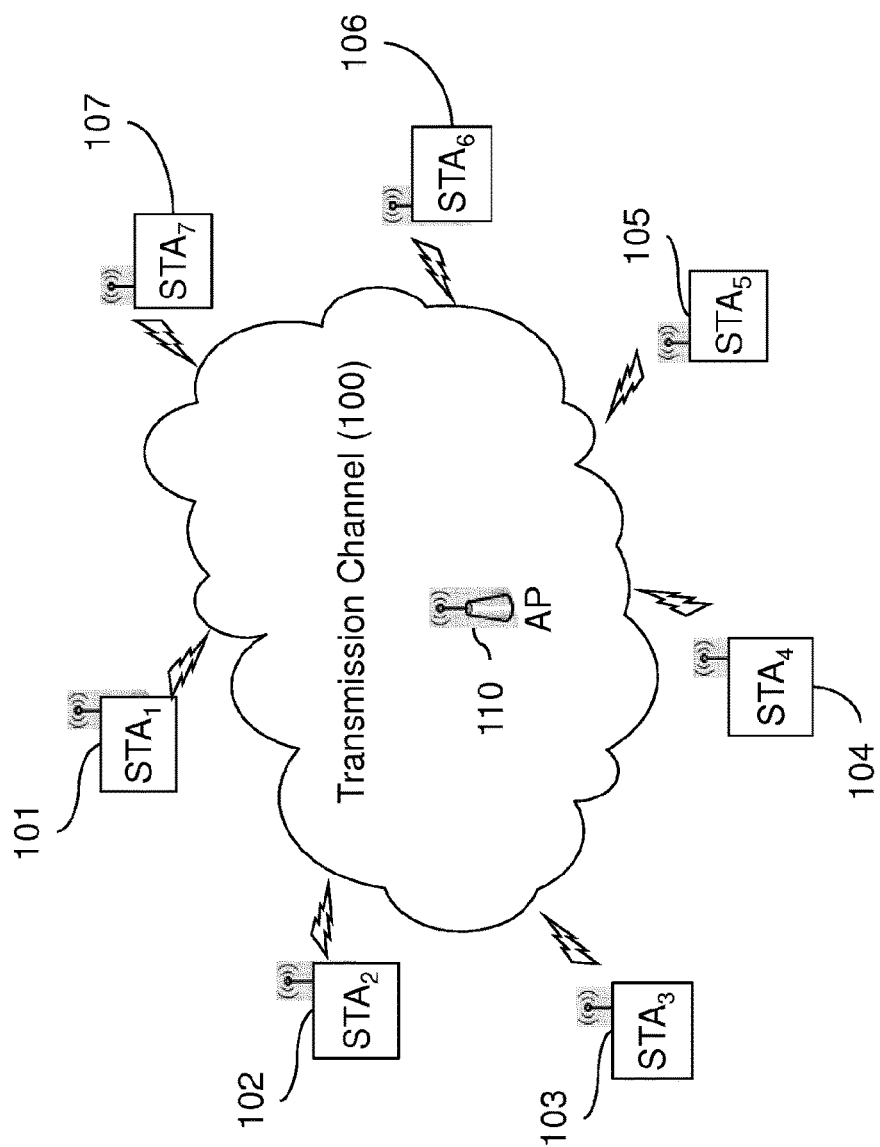
FIG. 1 illustrates a typical wireless communication system in which embodiments of the invention may be implemented.

FIG. 1 illustrates a communication system in which several communication nodes or stations 101-107 (STA$_1$-STA$_7$) exchange data frames over a radio transmission channel 100 of a wireless local area network (WLAN), under the management of a central station or access point (AP) 110. The radio transmission channel 100 is defined by an operating frequency band constituted typically by a single 20 MHz channel or a plurality of 20 MHz channels forming a composite channel.

Access to the shared radio medium to send data frames may be based on the CSMA/CA technique, for sensing the carrier and avoiding collisions by separating concurrent transmissions in space and time.

Carrier sensing in CSMA/CA is performed by both physical and virtual mechanisms. Virtual carrier sensing is achieved by transmitting control frames to reserve the medium prior to transmission of data frames.

Next, a source node first attempts through the physical mechanism, to sense a medium that has been idle for at least one DIFS (standing for DCF InterFrame Spacing) time period, before transmitting data frames.

However, if it is sensed that the shared radio medium is busy during the DIFS period, the source node continues to wait until the radio medium becomes idle. To do so, it starts a countdown backoff counter designed to expire after a number of timeslots chosen randomly between [0, CW], CW (integer) being referred to as the Contention Window. This backoff mechanism or procedure is the basis of the collision avoidance mechanism that defers the transmission time for a random interval, thus reducing the probability of collisions on the shared channel. After the random interval, the source node may send data or control frames if the medium is idle.

One problem of wireless data communications is that it is not possible for the source node to listen while sending, thus preventing the source node from detecting data corruption due to channel fading or interference or collision phenomena. A source node remains unaware of the corruption of the data frames sent and continues to transmit the frames unnecessarily, thus wasting access time.

The Collision Avoidance mechanism of CSMA/CA thus provides positive acknowledgement (ACK) of the sent data frames by the receiving node if the frames are received with success, to notify the source node that no corruption of the sent data frames occurred.

The ACK is transmitted at the end of reception of the data frame, immediately after a period of time called Short InterFrame Space (SIFS).

If the source node does not receive the ACK within a specified ACK timeout or detects the transmission of a different frame on the channel, it may infer data frame loss. In that case, it generally reschedules the frame transmission according to the above-mentioned backoff procedure. However, this can be seen as a bandwidth waste if only the ACK has been corrupted but the data frames were correctly received by the receiving node.

To improve the Collision Avoidance efficiency of CSMA/CA, a four-way handshaking mechanism is optionally implemented. One implementation is known as the RTS/CTS exchange, defined in the 802.11 standard.

The RTS/CTS exchange consists in exchanging control frames to reserve the radio medium prior to transmitting data frames during a transmission opportunity called TXOP in the 802.11 standard as described below, thus protecting data transmissions from any further collisions.

Figure 2:
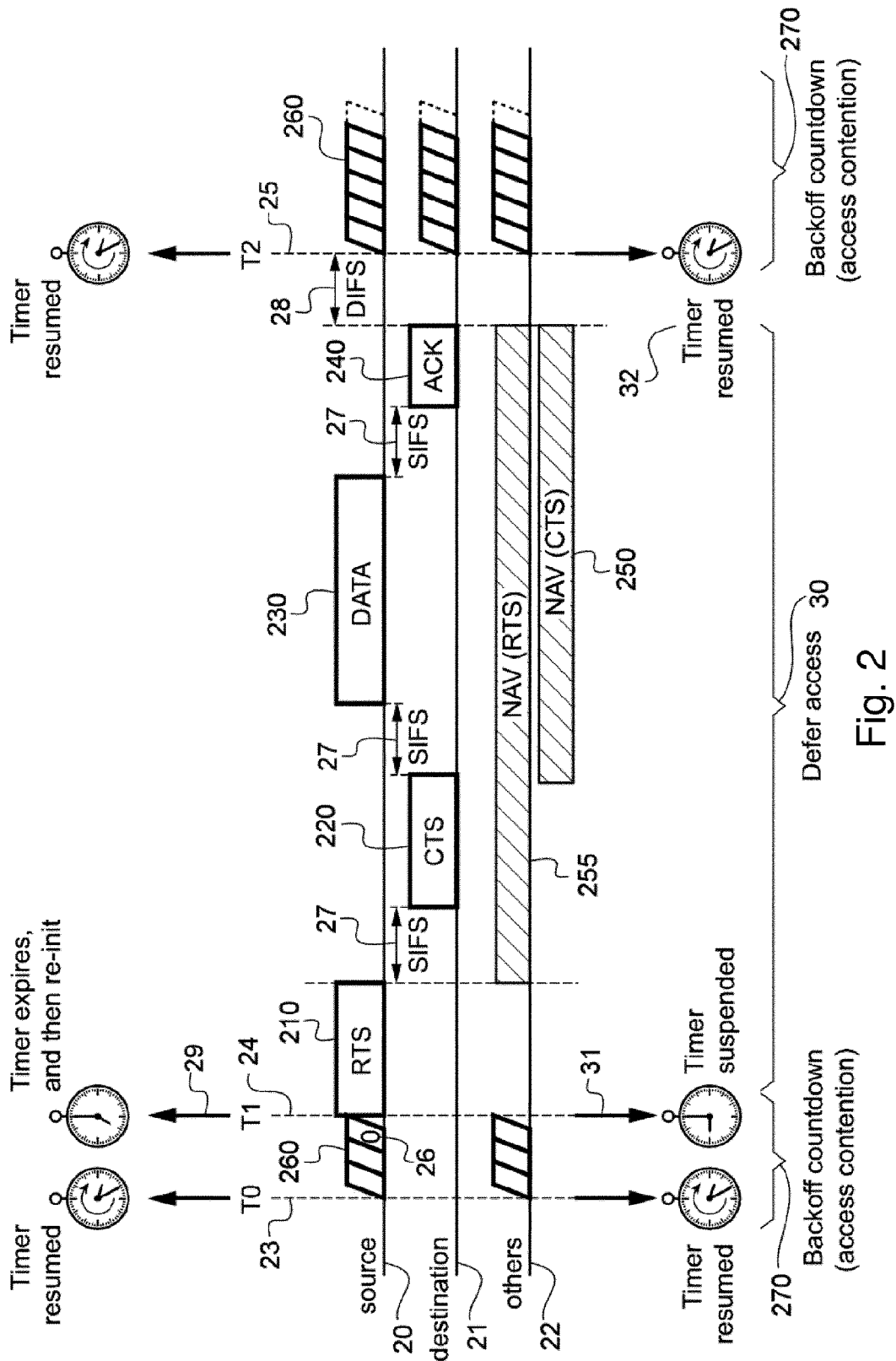
FIG. 2 is a timeline schematically illustrating a conventional communication mechanism according to the IEEE 802.11 standard.

FIG. 2 illustrates the behaviour of three groups of nodes during a conventional communication over a 20 MHz channel of the 802.11 medium: transmitting or source node 20, receiving or addressee or destination node 21 and other nodes 22 not involved in the current communication.

Upon starting the backoff process 270 prior to transmitting data, a station e.g. source node 20, initializes its backoff time counter to a random value as explained above. The backoff time counter is decremented once every time slot interval 260 for as long as the radio medium is sensed idle (countdown starts from T0, 23 as shown in the Figure).

The time unit in the 802.11 standard is the slot time called 'aSlotTime' parameter. This parameter is specified by the PHY (physical) layer (for example, aSlotTime is equal to 9 μs for the 802.11n standard). All dedicated space durations (e.g. backoff) add multiples of this time unit to the SIFS value.

The backoff time counter is 'frozen' or suspended when a transmission is detected on the radio medium channel (countdown is stopped at T1, 24 for other nodes 22 having their backoff time counter decremented).

The countdown of the backoff time counter is resumed or reactivated when the radio medium is sensed idle anew, after a DIFS time period. This is the case for the other nodes at T2, 25 as soon as the transmission opportunity TXOP granted to source node 20 ends and the DIFS period 28 elapses. DIFS 28 (DCF inter-frame space) thus defines the minimum waiting time for a source node before trying to transmit some data. In practice, DIFS=SIFS+2*aSlotTime.

When the backoff time counter reaches zero (26) at T1, the timer expires, the corresponding node 20 requests access onto the medium in order to be granted a TXOP, and the backoff time counter is reinitialized 29 using a new random backoff value.

In the example of the Figure implementing the RTS/CTS scheme, at T1, the source node 20 that wants to transmit data frames 230 sends a special short frame or message acting as a medium access request to reserve the radio medium, instead of the data frames themselves, just after the channel has been sensed idle for a DIFS or after the backoff period as explained above.

The medium access request is known as a Request-To-Send (RTS) message or frame. The RTS frame generally includes the addresses of the source and receiving nodes ("destination 21") and the duration for which the radio medium is to be reserved for transmitting the control frames (RTS/CTS) and the data frames 230.

Upon receiving the RTS frame and if the radio medium is sensed as being idle, the receiving node 21 responds, after a SIFS time period 27 (for example, SIFS is equal to 16 μs for the 802.11n standard), with a medium access response, known as a Clear-To-Send (CTS) frame. The CTS frame also includes the addresses of the source and receiving nodes, and indicates the remaining time required for transmitting the data frames, computed from the time point at which the CTS frame starts to be sent.

The CTS frame is considered by the source node 20 as an acknowledgment of its request to reserve the shared radio medium for a given time duration.

Thus, the source node 20 expects to receive a CTS frame 220 from the receiving node 21 before sending data 230 using unique and unicast (one source address and one addressee or destination address) frames.

The source node 20 is thus allowed to send the data frames 230 upon correctly receiving the CTS frame 220 and after a new SIFS time period 27.

An ACK frame 240 is sent by the receiving node 21 after having correctly received the data frames sent, after a new SIFS time period 27.

If the source node 20 does not receive the ACK 240 within a specified ACK Timeout (generally within the TXOP), or if it detects the transmission of a different frame on the radio medium, it reschedules the frame transmission using the backoff procedure anew.

Since the RTS/CTS four-way handshaking mechanism 210/220 is optional in the 802.11 standard, it is possible for the source node 20 to send data frames 230 immediately upon its backoff time counter reaching zero (i.e. at T1).

The requested time duration for transmission defined in the RTS and CTS frames defines the length of the granted transmission opportunity TXOP, and can be read by any listening node ("other nodes 22" in FIG. 2) in the radio network.

To do so, each node has in memory a data structure known as the network allocation vector or NAV to store the time duration for which it is known that the medium will remain busy. When listening to a control frame (RTS 210 or CTS 220) not addressed to itself, a listening node 22 updates its NAVs (NAV 255 associated with RTS and NAV 250 associated with CTS) with the requested transmission time duration specified in the control frame. The listening nodes 22 thus keep in memory the time duration for which the radio medium will remain busy.

Access to the radio medium for the other nodes 22 is consequently deferred 30 by suspending 31 their associated timer and then by later resuming 32 the timer when the NAV has expired.

This prevents the listening nodes 22 from transmitting any data or control frames during that period.

It is possible that receiving node 21 does not receive RTS frame 210 correctly due to a message/frame collision or to fading. Even if it does receive it, receiving node 21 may not always respond with a CTS 220 because, for example, its NAV is set (i.e. another node has already reserved the medium). In any case, the source node 20 enters into a new backoff procedure.

The RTS/CTS four-way handshaking mechanism is very efficient in terms of system performance, in particular with regard to large frames since it reduces the length of the messages involved in the contention process.

In detail, assuming perfect channel sensing by each communication node, collision may only occur when two (or more) frames are transmitted within the same time slot after a DIFS 28 (DCF inter-frame space) or when their own backoff counter has reached zero nearly at the same time T1. If both source nodes use the RTS/CTS mechanism, this collision can only occur for the RTS frames. Fortunately, such collision is early detected by the source nodes since it is quickly determined that no CTS response has been received.

FIGS. 3a, 3b and 3c illustrate the IEEE 802.11e EDCA involving access categories, in order to improve the quality of service (QoS). In the original standard, a communication node includes only one transmission queue/buffer. However, since a subsequent data frame cannot be transmitted until the transmission/retransmission of a preceding frame ends, the delay in transmitting/retransmitting the preceding frame prevents the communication from having QoS.

The IEEE 802.11e has overturned this deficiency in providing quality of service (QoS) enhancements to make more efficient use of the wireless medium.

This standard relies on a coordination function, called hybrid coordination function (HCF), which has two modes of operation: enhanced distributed channel access (EDCA) and HCF controlled channel access (HCCA).

EDCA enhances or extends functionality of the original access DCF method: EDCA has been designed for support of prioritized traffic similar to DiffServ (Differentiated Services), which is a protocol for specifying and controlling network traffic by class so that certain types of traffic get precedence.

EDCA is the dominant channel access mechanism in WLANs because it features a distributed and easily deployed mechanism.

The above deficiency of failing to have satisfactory QoS due to delay in frame retransmission can be solved with a plurality of transmission queues/buffers.

QoS support in EDCA is achieved with the introduction of four Access Categories (ACs), and thereby of four corresponding transmission queues or buffers (310).

Each AC has its own transmission queue/buffer to store corresponding data frames to be transmitted on the network. The data frames, namely the MSDUs, incoming from an upper layer of the protocol stack are mapped onto one of the four AC queues/buffers and thus input in the mapped AC buffer.

Each AC has also its own set of channel access parameters, and is associated with a priority value, thus defining traffic of higher or lower priority of MSDUs.

That means that each AC (and corresponding buffer) acts as an independent DCF contending entity including its respective backoff engine 311. In other words, the ACs within the same communication node compete one with each other to access the wireless medium and to obtain a transmission opportunity, using the contention mechanism as explained above with reference to FIG. 2 for example.

Service differentiation between the ACs is achieved by setting different contention window parameters (CWmin, CWmax), arbitrary interframe spaces (AIFS), and transmission opportunity duration limits (TXOP_Limit).

With EDCA, high priority traffic has a higher chance of being sent than low priority traffic: a node with high priority traffic waits a little less (low CW) before it sends its packet, on average, than a node with low priority traffic.

The four AC buffers (310) are shown in FIG. 3a.

Buffers AC3 and AC2 are usually reserved for real-time applications (e.g., voice or video transmission). They have, respectively, the highest priority and the last-but-one highest priority.

Buffers AC1 and AC0 are reserved for best effort and background traffic. They have, respectively, the last-but-one lowest priority and the lowest priority.

Each data unit, MSDU, arriving at the MAC layer from an upper layer (e.g. Link layer) with a priority is mapped into an AC according to mapping rules. FIG. 3b shows an example of mapping between eight priorities of traffic class (User Priorities or UP, 0-7 according IEEE 802.1d) and the four ACs. The data frame is then stored in the buffer corresponding to the mapped AC.

When the backoff procedure of an AC ends, the MAC controller (reference 704 in FIG. 7 below) of the transmitting node transmits a data frame from this AC to the physical layer for transmission onto the wireless communication network.

Since the ACs operate concurrently in accessing the wireless medium, it may happen that two ACs of the same communication node have their backoff ending simultaneously. In such a situation, a virtual collision handler (312) of the MAC controller operates a selection of the AC having the highest priority between the conflicting ACs, and gives up transmission of data frames from the ACs having lower priorities.

Then, the virtual collision handler commands those ACs having lower priorities to start again a backoff operation using an increased CW value.

FIG. 3c illustrates configurations of a MAC data frame and a QoS control field (300) included in the header of the IEEE 802.11e MAC frame.

The MAC data frame also includes, among other fields, a Frame Control header (301) and a frame body (302).

As represented in the Figure, the QoS control field 300 is made of two bytes, including the following information items:
- Bits B0 to B3 are used to store a traffic identifier (TID) which identifies a traffic stream. The traffic identifier takes the value of the transmission priority value (User Priority UP, value between 0 and 7—see FIG. 3b) corresponding to the data conveyed by the data frame or takes the value of a traffic stream identifier (TSID, value between 8 and 15) for other data streams.
- Bit B4 is set to 1 and is not detailed here.
- Bits B5 and B6 define the Ack policy subfield which specifies the acknowledgment policy associated with the data frame. This subfield is used to determine how the data frame has to be acknowledged by the receiving node. Usually, it may take three different values as follows:
  value equal to "Normal ACK" in the case where the transmitting node or source node requires a conventional acknowledgment to be sent (by the receiving node) after a short interframe space (SIFS) period following the transmission of the data frame;
  value equal to "No ACK" in the case where the source node does not require acknowledgment. That means that the receiving node takes no action upon receipt of the data frame; and
  value equal to "Block ACK" for acknowledgment per block of MSDUs. The Block Ack scheme allows two or more data frames 230 to be transmitted before a Block ACK frame is returned to acknowledge the receipt of the data frames. The Block ACK increases communication efficiency since only one signalling ACK frame is needed to acknowledge a block of frames, while every ACK frame originally used has a significant overhead for radio synchronization. The receiving node takes no action immediately upon receiving the last data frame, except the action of recording the state of reception in its scoreboard context. With such a value, the source node is expected to send a Block ACK request (BAR) frame, to which the receiving node responds using the procedure described below.
- Bit B7 (350) is reserved (not used by the current 802.11 standards).
- Bits B8-B15 indicate the amount of buffered traffic for a given TID at the non-AP station sending this frame. The AP may use this information to determine the next TXOP duration it will grant to the station. A queue size of 0 indicates the absence of any buffered traffic for that TID.

Figure 4:
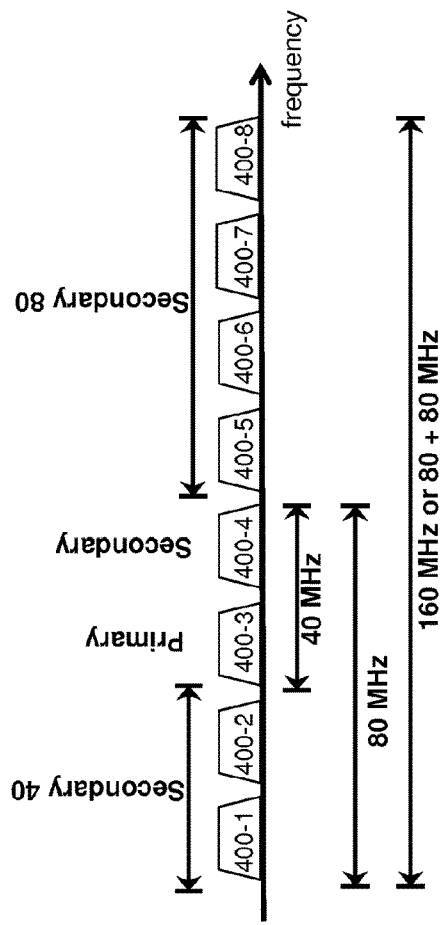
FIG. 4 illustrates 802.11ac channel allocation that supports composite channel bandwidths of 20 MHz, 40 MHz, 80 MHz or 160 MHz.

To meet the ever-increasing demand for faster wireless networks to support bandwidth-intensive applications, 802.11ac is targeting larger bandwidth transmission through multi-channel allocations. FIG. 4 illustrates 802.11ac channel allocation that supports composite channel bandwidths of 20 MHz, 40 MHz, 80 MHz or 160 MHz.

IEEE 802.11ac introduces support of a restricted number of predefined subsets of 20 MHz channels to form the sole predefined composite channels configurations that are available for reservation by any 802.11ac node on the wireless network to transmit data.

The predefined subsets are shown in the figure and correspond to 20 MHz, 40 MHz, 80 MHz, and 160 MHz composite channel bandwidths, compared to only 20 MHz and 40 MHz supported by 802.11n. Indeed, the 20 MHz component channels 400-1 to 400-8 are concatenated to form wider communication composite channels.

In the 802.11ac standard, the channels of each predefined 40 MHz, 80 MHz or 160 MHz subset are contiguous within the operating band, i.e. no hole (missing channel) in the composite channel as ordered in the operating band is allowed.

The 160 MHz channel bandwidth is composed of two 80 MHz channels that may or may not be frequency contiguous (while being contiguous within the operating band). The 80 MHz and 40 MHz channels are respectively composed of two frequency adjacent or contiguous 40 MHz and 20 MHz channels, respectively.

Note that embodiments of the invention apply to any composition of channel bandwidth, including any contiguous and non contiguous predefined subset within the operating band.

A node is granted a TXOP through the enhanced distributed channel access (EDCA) mechanism on the "primary channel" (400-3). Indeed, for each composite channel, 802.11ac designates one 20 MHz channel as "primary", meaning that it is used for contending for access to the composite channel. The primary 20 MHz channel is common to all nodes (STAs) belonging to the same basic set, i.e. managed by or registered to the same local Access Point (AP).

However, to make sure that no other legacy nodes (i.e. nodes having their primary channel mapped to a secondary channel of the basic set) uses the secondary channels, it is provided that the control frames (e.g. RTS frame/CTS frame) reserving the composite channel are duplicated over each 20 MHz channel of such composite channel.

As addressed earlier, the IEEE 802.11ac standard enables up to four, or even eight, 20 MHz channels to be bound. Because of the limited number of channels (19 in the 5 GHz band in Europe), channel saturation becomes problematic. Indeed, in densely populated areas, the 5 GHz band will surely tend to saturate even with a 20 or 40 MHz bandwidth usage per Wireless-LAN cell.

Developments in the 802.11ax standard seek to enhance efficiency and usage of the wireless channel for dense environments.

In this perspective, one may consider multi-user (MU) transmission features, allowing multiple simultaneous transmissions to/from different users in both downlink and uplink directions. In the uplink (UL), multi-user transmissions can be used to mitigate the collision probability by allowing multiple nodes to simultaneously transmit.

To actually perform such multi-user transmission, it has been proposed to split a granted 20 MHz channel into sub-channels (elementary sub-channels), also referred to as resource units (RUs), that are shared in the frequency domain by multiple users, based for instance on Orthogonal Frequency Division Multiple Access (OFDMA) technique.

OFDMA is a multi-user variation of OFDM which has emerged as a new key technology to improve efficiency in advanced infrastructure-based wireless networks. It combines OFDM on the physical layer with Frequency Division Multiple Access (FDMA) on the MAC layer, allowing different subcarriers to be assigned to different nodes in order to increase concurrency. Adjacent sub-carriers often experience similar channel conditions and are thus grouped to sub-channels: an OFDMA sub-channel or RU is thus a set of sub-carriers.

As currently envisaged for 802.11ax, the granularity of such OFDMA sub-channels is finer than the original 20 MHz channel band. Typically, a 2 MHz or 5 MHz OFDMA sub-channel may be contemplated as a minimal width, therefore defining for instance 9 OFDMA sub-channels or resource units within a single 20 MHz channel.

Figure 5A:
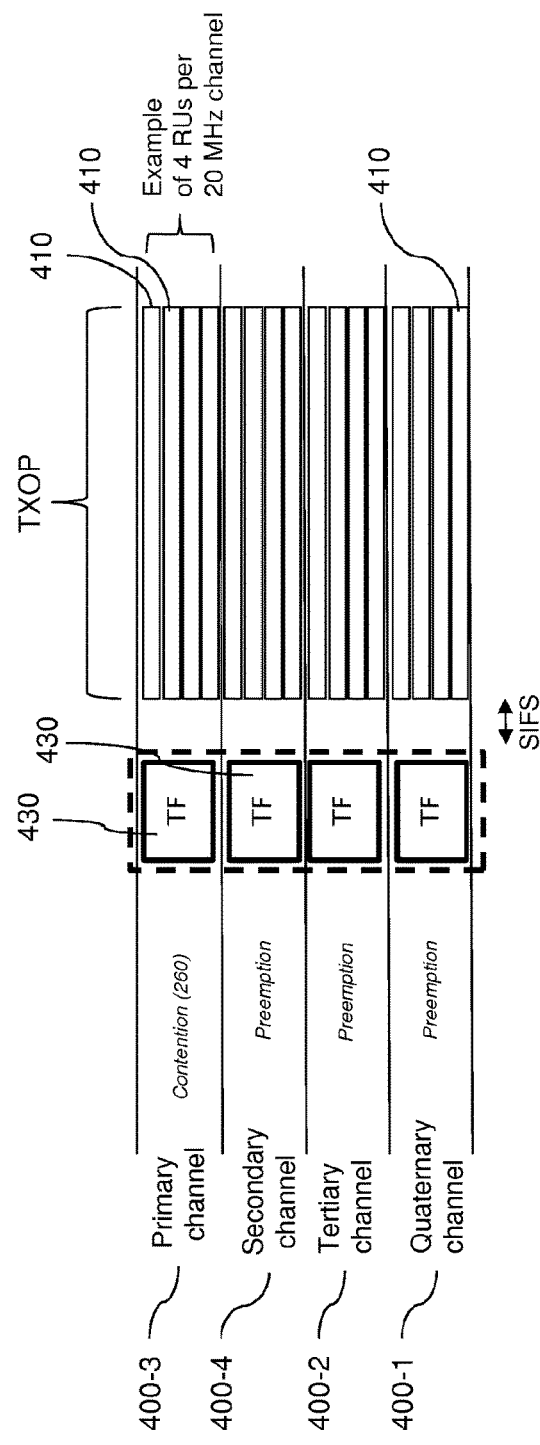
FIGS. 5a and 5b illustrate different examples of uplink OFDMA transmission scheme, wherein the AP issues a Trigger Frame for reserving a transmission opportunity of OFDMA sub-channels (resource units) on an 80 MHz channel.

FIG. 5a illustrates an example of uplink OFDMA transmission scheme. In this example, each 20 MHz channel (400-1, 400-2, 400-3 or 400-4) is sub-divided in frequency domain in four OFDMA sub-channels or RUs 410 of size 5 MHz. These sub-channels (or resource units or sets of "sub-carriers") may also be referred to as "traffic channels".

Of course the number of RUs splitting a 20 MHz channel may be different from four. For instance, between two to nine RUs may be provided (thus each having a size between 10 MHz and about 2 MHz).

To support multi-user uplink, e.g. uplink transmission to the 802.11ax access point (AP) during the granted TXOP, the 802.11ax AP has to provide signalling information for the legacy nodes (non-802.11ax nodes) to set their NAV and for the 802.11ax nodes to determine the allocation of the resource units RUs.

In order to trigger uplink communications from the nodes, a trigger frame (TF) 430 may be sent by the AP. The trigger frame reserves a transmission opportunity on one or more channels of the wireless network for the plurality of nodes.

The trigger frame may designate the resource units (RUs) 410 that can be accessed by the stations for their uplink communications. Designated RUs may be "Random RUs" dedicated for contention based random access. In other words, Random RUs designated or allocated by the AP in the TF may serve as basis for contention between stations willing to access the communication medium for sending data frames. A collision occurs when two or more stations attempt to transmit at the same time over the same RU. Designated RUs may also be "scheduled RUs", in addition or in replacement of the Random RUs. Scheduled RUs may be reserved for certain stations, in which case no contention for accessing such RUs is needed for sending data frames.

Alternatively, a trigger frame may designate only RUs of random type (Random RUs). This trigger frame is referred to as a trigger frame for random access (TF-R). A TF-R may be emitted by the AP to allow multiple stations to perform UL MU (UpLink Multi-User) random access to acquire a TXOP for their UL transmissions.

The trigger frame thus defines according to one implementation resource units including a plurality of random resource units that the nodes can access using a contention scheme.

The trigger frame may include additional signalling towards the stations, such as the bandwidth or width of the targeted composite channel, meaning that a 20, 40, 80 or 160 MHz value is coded in the trigger frame.

The TF frame may be sent over the primary 20 MHz channel and replicated (duplicated) on each other 20 MHz channel forming the bandwidth of the targeted composite channel. As described above for the duplication of control frames, it is expected that every nearby legacy node (non-HT or 802.11ac node) receiving the TF on its primary channel sets its NAV to the value specified in the TF frame. This prevents these legacy nodes from accessing the channels of the targeted composite channel during the TXOP.

Embodiments of the invention rely advantageously on the division of 20 MHz channels into sub-channels (RUs), which allows for optimizing the usage of the bandwidth by the multiple stations of the network.

The sub-division of the 20 MHz channels can be performed in the frequency domain and shared by multiple users using for example the Orthogonal Frequency Division Multiple Access (OFDMA) technique as discussed above. This results into OFDMA sub-channels.

Figure 5B:
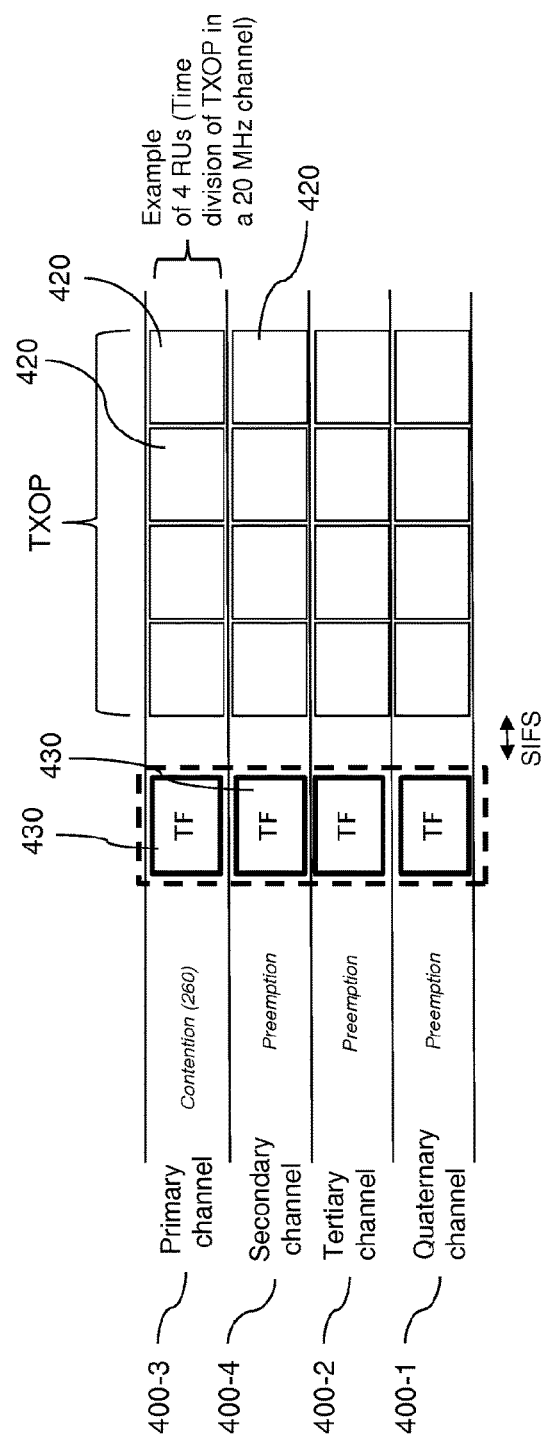

The sub-division can also be performed in the time domain relying on TDMA (Time Division Multiple Access). This results into TDMA sub-channels. FIG. 5b illustrates an example of uplink TDMA transmission scheme. In this example, the TXOP is sub-divided in time domain in TDMA sub-channels 420 of 20 MHz width. Any combination of TDMA and OFDMA can also be envisaged for defining the RUs.

More generally, embodiments of the invention may rely on a plurality of channels which can be accessed by a plurality of nodes (multi-user channels), wherein a channel may correspond to:
  a RU (e.g. OFDMA or TDMA sub-channel) resulting from the sub-division of a 20 MHz channel as described above;
  a 20 MHz channel itself, the plurality of channels may thus correspond to the composite channel or part of the composite channel (or inversely, a channel results from the division of the composite channel or part of the composite channel); or
  any communication resource of the communication medium comprising a plurality of resources that can be accessed by a plurality of nodes.

A trigger frame in this context defines communication channels including a plurality of random channels that the nodes access using a contention scheme.

Embodiments of the invention provide a contention procedure to be used by the nodes to randomly access the plurality of channels and transmit data, i.e. the embodiments define a multi-user channels access and transmission method.

More particularly and in order to improve the efficiency of the system with regards to un-managed traffic towards the AP (for example, uplink management frames from associated stations, unassociated nodes intending to reach an AP, or simply un-managed data traffic), there is a need for random access onto the multi-user TXOP over the available RUs discussed above. In this context, there is a need for a random procedure for selecting the stations allowed to transmit in the multi-user TXOP and/or selecting the OFDMA sub-channel(s) to be accessed to by the selected stations.

FIG. 6 schematically illustrates a communication device 600 of the radio network 100, configured to implement at least one embodiment of the present invention. The communication device 600 may preferably be a device such as a microcomputer, a workstation or a light portable device. The communication device 600 comprises a communication bus 613 to which there are preferably connected:
  a central processing unit 611, such as a microprocessor, denoted CPU;
  a read only memory 607, denoted ROM, for storing computer programs for implementing the invention;
  a random access memory 612, denoted RAM, for storing the executable code of methods according to embodiments of the invention as well as the registers adapted to record variables and parameters necessary for implementing methods according to embodiments of the invention; and at least one communication interface 602 connected to the radio communication network 100 over which digital data packets or frames or control frames are transmitted, for example a wireless communication network according to the 802.11ax protocol. The frames are written from a FIFO sending memory in RAM 612 to the network interface for transmission or are read from the network interface for reception and writing into a FIFO receiving memory in RAM 612 under the control of a software application running in the CPU 611.

Optionally, the communication device 600 may also include the following components:

a data storage means 604 such as a hard disk, for storing computer programs for implementing methods according to one or more embodiments of the invention;

a disk drive 605 for a disk 606, the disk drive being adapted to read data from the disk 606 or to write data onto said disk;

a screen 609 for displaying decoded data and/or serving as a graphical interface with the user, by means of a keyboard 610 or any other pointing means.

The communication device 600 may be optionally connected to various peripherals, such as for example a digital camera 608, each being connected to an input/output card (not shown) so as to supply data to the communication device 600.

Preferably the communication bus provides communication and interoperability between the various elements included in the communication device 600 or connected to it. The representation of the bus is not limiting and in particular the central processing unit is operable to communicate instructions to any element of the communication device 600 directly or by means of another element of the communication device 600.

The disk 606 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to the invention to be implemented.

The executable code may optionally be stored either in read only memory 607, on the hard disk 604 or on a removable digital medium such as for example a disk 606 as described previously. According to an optional variant, the executable code of the programs can be received by means of the communication network 603, via the interface 602, in order to be stored in one of the storage means of the communication device 600, such as the hard disk 604, before being executed.

The central processing unit 611 is preferably adapted to control and direct the execution of the instructions or portions of software code of the program or programs according to the invention, which instructions are stored in one of the aforementioned storage means. On powering up, the program or programs that are stored in a non-volatile memory, for example on the hard disk 604 or in the read only memory 607, are transferred into the random access memory 612, which then contains the executable code of the program or programs, as well as registers for storing the variables and parameters necessary for implementing the invention.

In a preferred embodiment, the apparatus is a programmable apparatus which uses software to implement the invention. However, alternatively, the present invention may be implemented in hardware (for example, in the form of an Application Specific Integrated Circuit or ASIC).

FIG. 7 is a block diagram schematically illustrating the architecture of the communication device 600 in its role as one of the nodes (or stations) 101-107 or an AP 110 according to embodiments of the invention. As illustrated, node 600 comprises a physical (PHY) layer block 703, a MAC layer block 702, and an application layer block 701.

The PHY layer block 703 (e.g. a 802.11 standardized PHY layer) has the task of formatting, modulating on or demodulating from any channel, and sending or receiving frames over the radio medium (transmission channel) 100 used. The transmitted/received frames may be 802.11 frames; for instance medium access trigger frames of the TF 430 type to reserve a transmission slot, MAC data and management frames base on a 20 MHz width to interact with legacy 802.11 stations, as well as of MAC data frames of OFDMA type having smaller width than 20 MHz legacy (typically 2 or 5 MHz) to/from that radio medium.

The MAC layer block or controller 702 preferably comprises a MAC 802.11 layer 704 implementing conventional 802.11ax MAC operations, and an additional block 705 for carrying out, at least partially, embodiments of the invention. The MAC layer block 702 may optionally be implemented in software, which software is loaded into RAM 612 and executed by CPU 611.

Preferably, the additional block, referred to RU random allocation module 705 for allocating, e.g. OFDMA resources (sub-channels), implements the part of the invention that regards node 600, i.e. transmitting operations for a source node, receiving operations for a receiving node.

On top of the Figure, application layer block 701 runs an application that generates and receives data packets, for example data packets of a video stream. Application layer block 701 represents all the stack layers above MAC layer according ISO standardization.

Figures 8A, 8B:
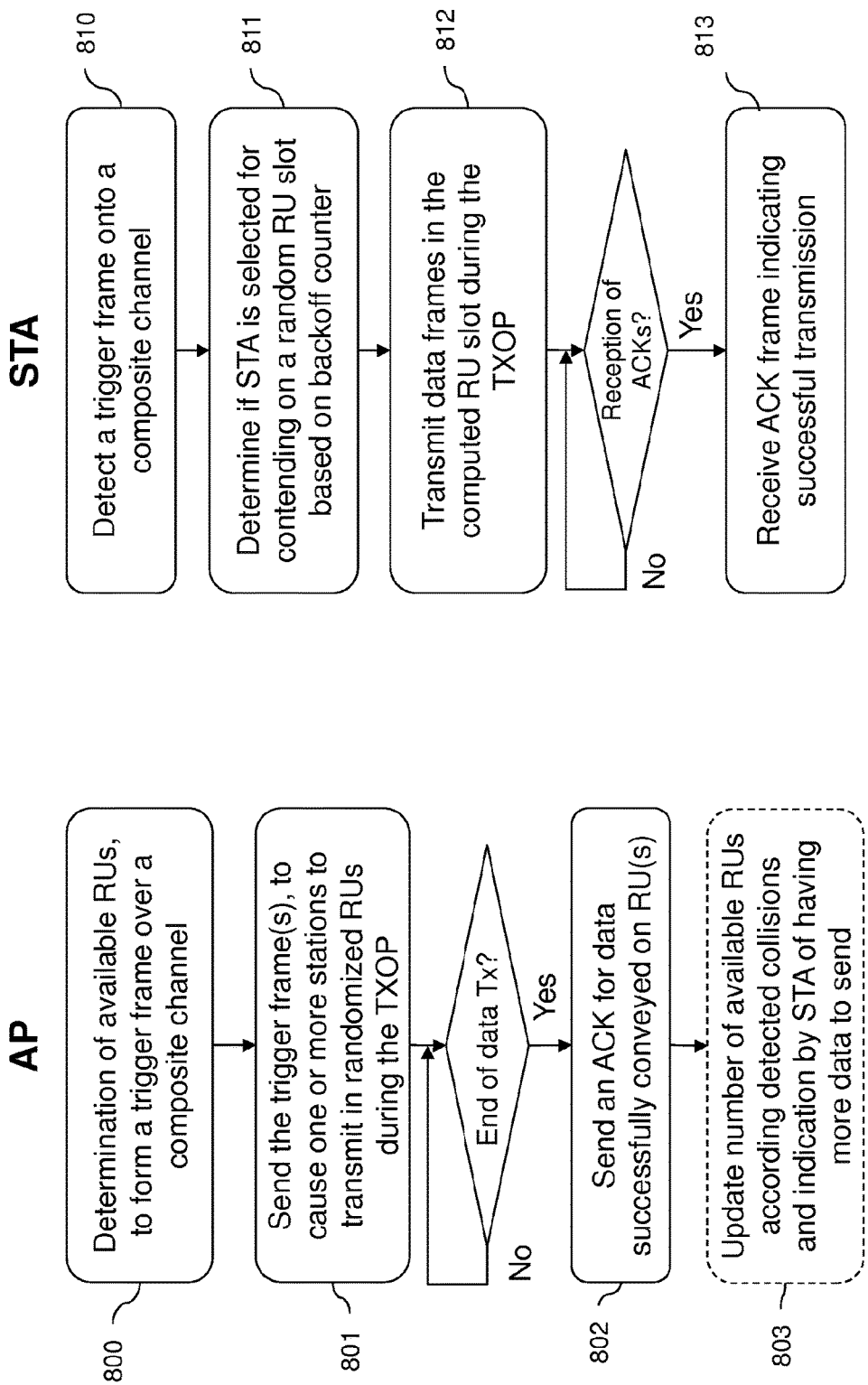
FIGS. 8a and 8b illustrate, using two flowcharts, general steps of a first exemplary embodiment of the present invention to provide random access to OFDMA Resource Unit for (uplink) multi-user OFDMA transmission.

The present invention in its different aspects is now illustrated using various exemplary embodiments from the nodes' perspective (FIGS. 7, 8b, 12 and 14) and from the AP's perspective (FIG. 8a).

Some of these exemplary embodiments (e.g. first, second and third exemplary embodiments) are described in the context of IEEE 80211.ax by considering OFDMA sub-channels. In the description of these embodiments, the term legacy refers to non-802.11ax nodes, meaning 802.11 nodes of previous technologies that do not support OFDMA communications.

Application of the invention is however not limited to IEEE 802.11ax context. Furthermore, embodiments of the invention do not necessarily rely on the usage of an OFDMA scheme, and any other scheme defining alternate resource units (e.g. TDMA sub-channels) or more generally channels to be access simultaneously or sequentially can also be used.

FIGS. 8a and 8b illustrate, using two flowcharts, general steps of a first exemplary embodiment of the present invention for providing random access to OFDMA Resource Units for (uplink) multi-user OFDMA transmission in the context of 802.11. FIG. 8a illustrates the embodiment from the AP's perspective and FIG. 8b illustrates the embodiment from the node's perspective.

Figure 9:
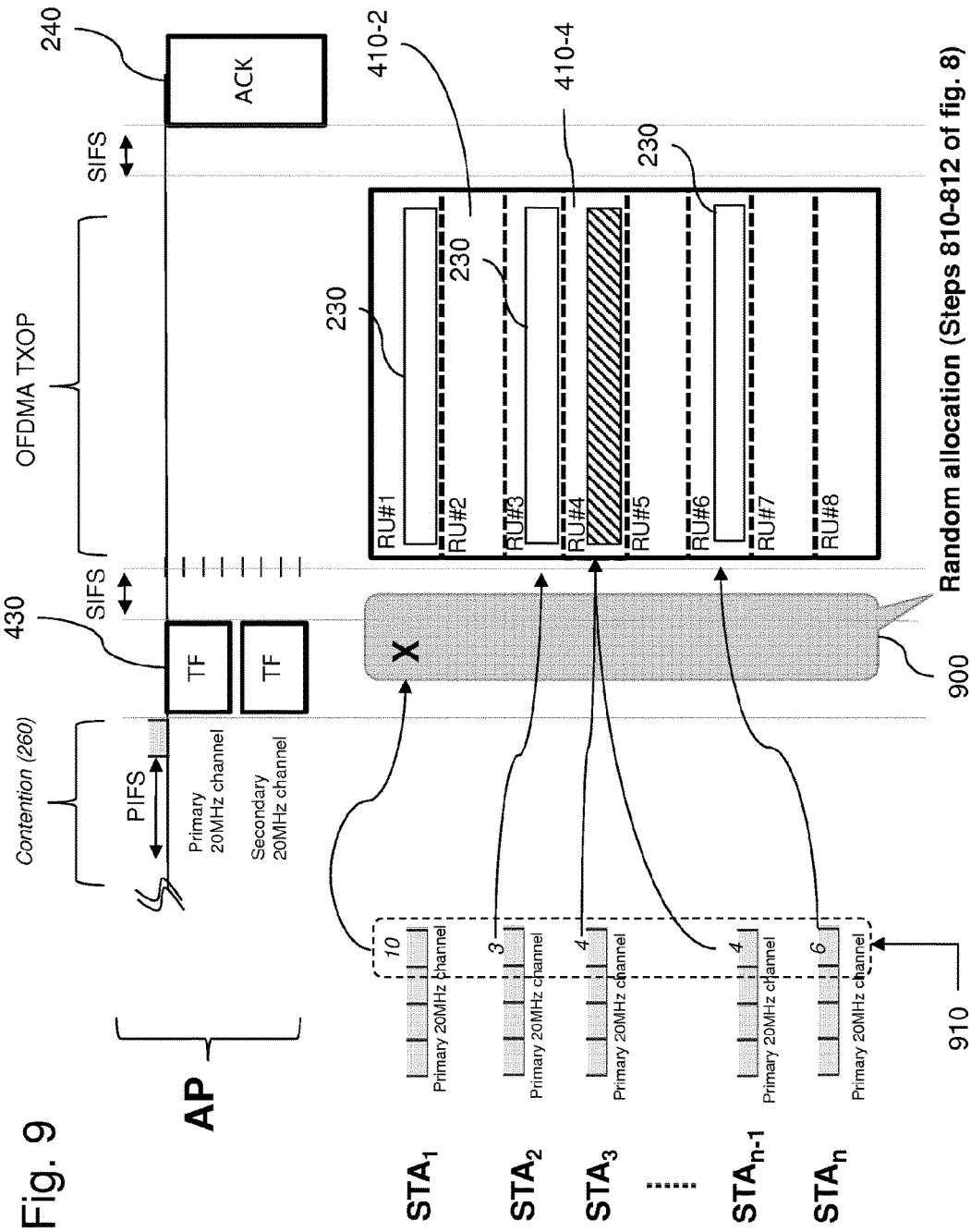
FIG. 9 and FIG. 13 illustrate exemplary communication lines resulting from an implementation of the embodiments of FIGS. 8a and 8b.

FIG. 9 illustrates exemplary communication lines resulting from an implementation of the first exemplary embodiment of FIGS. 8a and 8b. Although the illustration shows a WLAN system using a multi-channel including a 40 MHz bandwidth channel having a set of 8 OFDMA resource units, the number of 20 MHz bands forming the overall composite channel and/or the number of OFDMA resource units per 20 MHz channel bandwidth thereof may vary.

Also, the application of the invention is raised through examples that use the trigger frame mechanism sent by an AP for a multi-user uplink transmissions according to TF 430 of FIG. 5*a*. Of course, equivalent mechanisms may be used in a centralized or in an adhoc environment (no AP).

The allocation method according embodiments of the present invention is applicable to any 802.11 frame which is transmitted in the non-HT duplicate format (e.g. a trigger frame or any control frames which, in a preferred implementation, contains an information element informing about the number of resource units per 20 MHz channel band). It should be noted that the number of resource units available and/or their repartition are not necessarily signalled in the trigger or control frame. For example, the signalling may be performed in a RU (typically with less than 20 MHz bandwidth) previously reserved in a downlink OFDMA TXOP. The number of resource units and/or their repartition may also be predefined or shared by a different means between the nodes of the network.

The methods of FIGS. 8*a* and 8*b* are implemented by at least two stations 600, at least one being a simple station 101-107 and the other an access point. In other words, there are at least one source node having data to transmit to the other node, namely a destination or receiving node (like the AP for uplink communications).

Flowchart of FIG. 8*a* illustrates the algorithm performed to prepare a trigger frame and transmit it onto the wireless channel. This algorithm is performed by a receiving node like preferably an access point.

Although not limited in this respect, one way to implement this algorithm is as follows.

Step 800:

The AP determines the number of Resource Units to consider for the multi-user TXOP upon being granted. This determination is based on the BSS configuration environment, that is to say the basic operational width (namely 20 MHz, 40 MHz, 80 MHz or 160 MHz channels that include the primary 20 MHz channel according the 802.11ac standard). For the sake of simplicity, one may consider that a fixed number of OFDMA RUs is allocated per 20 MHz band: in that case, it is sufficient to add Bandwidth signalling in the TF frames (i.e. 20, 40, 80 or 160 MHz value is added). Typically, this information is signaled in the SERVICE field of the DATA section of non-HT frames according the 802.11 standard. These choices are advantageous for keeping legacy compliancy for the medium access mechanism.

In a preferred implementation, the TF contains an information element indicating that the multi-user TXOP is of random type (e.g. TF-R); that is to say multiple stations 600 can randomly contend for access a RU inside the OFDMA TXOP. That explicitly indicates that those source stations 600 are allowed to execute algorithm of FIG. 8*b*. As an example, this information element may take the form of one bit, which may be the reserved bit 7 (referenced as 350) of the QoS Control Field header (300) of a 802.11 MAC frame according to FIG. 3*c*.

Step 801:

AP sends a TF with an indication of the bandwidth of the intended TXOP.

It is expected that every nearby legacy node (non-802.11ax node) can receive the TF on its primary channel. Each of these nodes then sets its NAV to the value specified in the TF frame: the medium is thus reserved by the AP.

Flowchart of FIG. 8*b* illustrates the behaviour of a source station 600 for determining a random allocation of an OFDMA RU in direction to the receiving node (like an AP). Although not limited in this respect, one way to implement this random allocation is described hereafter.

Step 810:

At step 810, the source node 600 has to verify that it has received a 802.11a frame in a non-HT format. Preferably, the type of the frame indicates a trigger frame (TF), and the Receiver Address (RA) of the TF is a broadcast or group address (i.e. not a unicast address corresponding specifically to the source node 600 MAC address).

Upon receiving the trigger frame, the channel width occupied by the TF control frame is signaled in the SERVICE field of the 802.11 data frame (The DATA field is composed of SERVICE, PSDU, tail, and pad parts). The determination that the control frame is a Trigger Frame may be indicated through the frame control 301, which indicates the type of the received frame. The frame control 301 may include in addition to the type of the frame a sub-type for either identifying the trigger frame or the type of the trigger frame such as a TF-R. The support of random OFDMA TXOP may be determined also by the usage of reserved bit 7 (referenced as 350) of the QoS Control Field header (300) of the TF (in case of TF and random TF have same type/sub-type identifications).

If the received TF indicates a random type (e.g. trigger frame for random access TF-R, or a TF designating at least one RU of random type), then the algorithm continues in step 811.

Step 811:

All Resource Units (OFDMA sub-channels) supporting the OFDMA communication are known at this stage (e.g., the number of OFDMA RUs is fixed per 20 MHz band, and the operating band of the composite channel is detected in 810). Also, OFDMA sub-channels supporting random access (Random RUs) are designated in the signaling of the TF according to one implementation of the invention. In the following available RUs (or Resource Units for the OFDMA communication) will refer to Random RUs only if otherwise stated.

One can note that a transmitting node 600 is a node having at least one active backoff engine 311, which means with a value greater than 0 upon the reception of the trigger frame (because the AP preempts any medium access against stations, due to a PIFS duration lesser than the DIFS duration of the stations according the 802.11 standard). More than one backoff engine may be active per node when IEEE 802.11e EDCA involving access categories is implemented and data is ready for transmission from different transmission queues. The backoff counter value of an active backoff engine at the time the wireless medium was preempted by the AP is referred to as pending backoff value. Thus a plurality of pending backoff values may be pending at a time for a given node.

According to embodiments of the invention, pending backoff counter values of transmitter stations 600 are advantageously reused for randomly determining (selecting) a RU onto the OFDMA TXOP for transmitting data and/or for determining the eligibility of a station to transmit data.

First, the station determines according to the first exemplary embodiment if at least one of its pending backoff values fits in the number of Resource Units for the current OFDMA communication (i.e. Random RUs). As an example, if the number of random RUs is 8 (as illustrated in FIG. 9 for an exemplary 40 MHz band, wherein each 20 MHz channel band contains 4 OFDMA Resource Units), then all stations 600 having at least one active backoff engine with a pending backoff value that is less than or equal to 8 are considered as eligible for having access onto a Resource Unit.

More than one pending backoff value may fit into the number of Resource Units at a station leading to a plurality of transmission queues eligible for serving data to be transmitted in a RU. The virtual collision handler 312 may handle a number of eligible queues (typically up to 4) in relation with the transmission capabilities of each station 600: that is to say according to the maximum number of concurrent OFDMA transmissions supported by station 600.

If the capabilities of the node allow for only one channel of the communication medium to be used per node (e.g. maximum number of concurrent OFDMA transmissions per node is equal to one), thus in case of a plurality of pending backoff values of the node fitting into the number of Resource Units (i.e. a plurality of transmission queues are eligible), the virtual collision handler 312 takes the responsibility of resolving the selection of a single transmission queue. The selection may be based on EDCA traffic class prioritization. In a variant, the selection may be based on the corresponding pending backoff values; the transmission queue associated with the lowest pending backoff value is selected. Indeed, this corresponds to the transmission queue that would have accessed first the communication medium if a conventional 802.11 contention-based access mechanism were implemented (i.e. when the backoff counter reaches zero).

If the capabilities of the node allow for more than one channel to be used per node (e.g. maximum number of concurrent OFDMA transmissions per node greater than one), thus in case of a plurality of pending backoff values of the node fitting into the number of Resource Units, the virtual collision handler 312 takes the responsibility of selecting a plurality of eligible transmission queues to contend for access over available RUs. The number of eligible transmission queues selected by the virtual collision handler 312 is kept however smaller than or equal to the maximum number of possible concurrent channels. If the number of eligible transmission queues is greater than the maximum number of possible concurrent channels, the selection may be based on EDCA traffic class prioritization. For example, a transmitting station supporting only two concurrent OFDMA transmissions and having three active backoff engines (for example, a pending backoff value of 3 for VOICE traffic queue, a pending backoff of 4 for BACKGROUND traffic queue, and a pending backoff of 5 for VIDEO traffic queue) would select VOICE and VIDEO traffic queues to serve data for transmission on two RUs of the communication medium. In a variant, the selection may be based on the corresponding pending backoff values; lower pending backoff values are given higher priority and are selected first. By reusing the above example, VOICE and BACKGROUND traffic queues would be selected in this variant.

Eligible transmission queues that were not selected (if any) are considered as collided and a new backoff counter value is redrawn.

Figure 14:
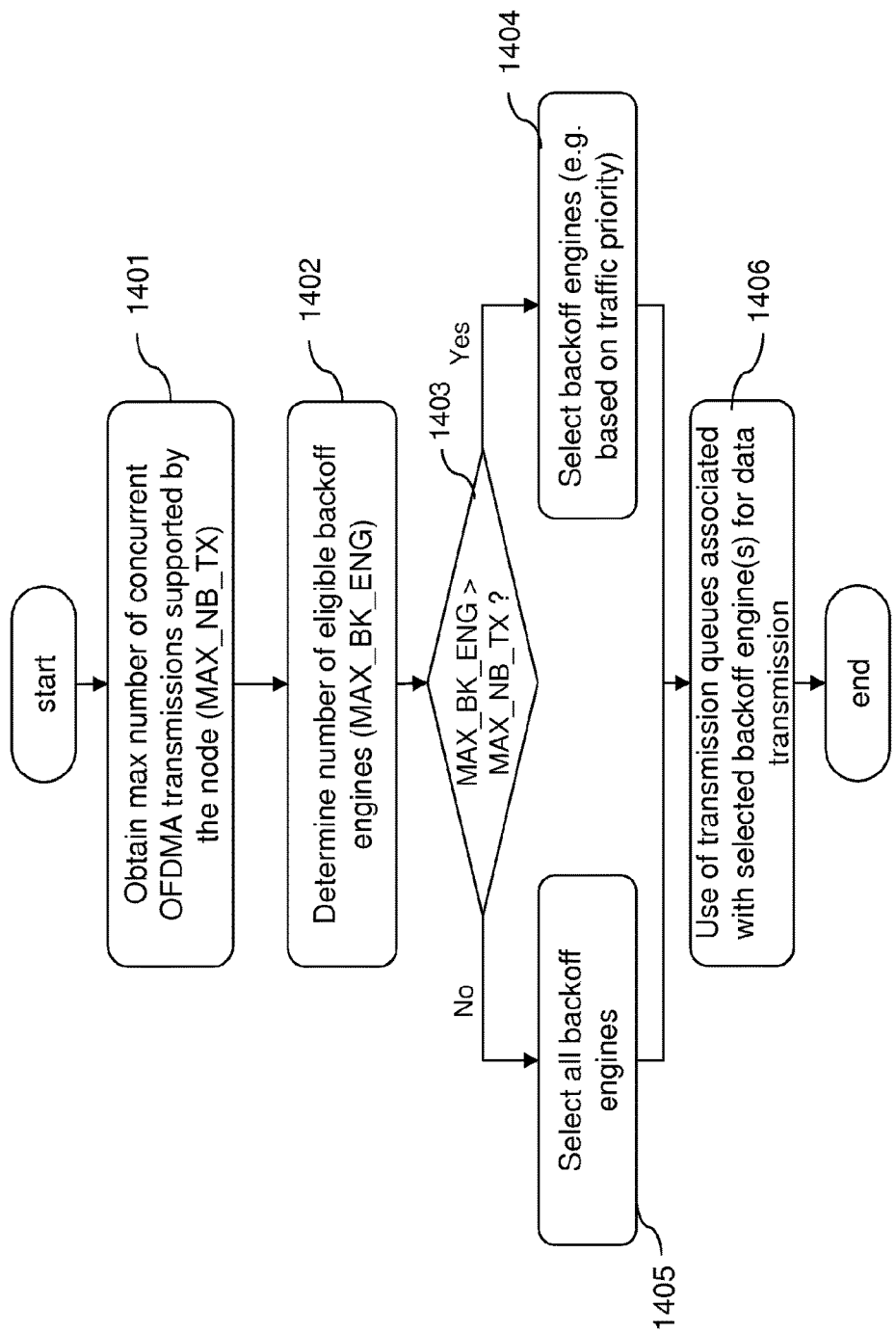
FIG. 14 illustrates, using a flowchart, a possible implementation of a virtual collision handler.

FIG. 14 illustrates, using a flowchart, a possible implementation of the virtual collision handler.

At step 1401 the maximum number of concurrent OFDMA transmissions supported by the node (MAX_NB_TX) is obtained. This information may be obtained from memory of the node and may correspond to a design or configuration option of the communication node.

At step 1402 the number of eligible backoff engines (MAX_BK_ENG) is determined. This corresponds to active backoff engines associated with transmission queues within the node that are eligible according to a given criteria to serve data if the node contents for access to a RU.

At step 1403 a test is performed to check if the number of eligible backoff engines (MAX_BK_ENG) is greater than the maximum number of concurrent OFDMA transmissions supported by the node (MAX_NB_TX). If the test is positive, a number of backoff engines equal to (or lower than) the number of concurrent OFDMA transmissions MAX_NB_TX is selected (1404); otherwise all the backoff engines may be selected (1405). The selection at step 1404 may be based on the priority of the traffic or on the pending backoff values.

At step 1406, transmission queues associated with selected backoff engines are used for data transmission.

If pending backoff values of two or more active backoff engines corresponding to eligible queues have the same value for the station 600, only one eligible queue among the virtually-collided queues may be selected. The other(s) virtually-collided queues are not selected. Alternatively, if two or more active backoff engines corresponding to eligible queues have the same value and the station is capable of supporting at least two concurrent OFDMA transmissions, then at least two virtually-collided queues may still be selected. In this variant, a one-to-one mapping between the pending backoff values and the RUs may not be applied and a selection method of the RUs over which transmission is performed that is independent from the pending backoff values may be used.

In step 811, a station 600 is determined as an eligible station if it contains at least one eligible transmission queue (as illustrated before, a transmission queue being stated as eligible if its corresponding pending backoff value is not greater than the number of OFDMA sub-channels for example, or any threshold value). As a result, an eligible station 600 may contain both eligible and non-eligible queues. In contrary, a transmitter station 600 that is stated as non-eligible station contains only non-eligible transmission queues (in this case, all pending backoff values are greater than the number of OFDMA sub-channels specified through the received TF).

According to embodiments of the invention, the RUs that can be randomly accessed are indexed (e.g. sequentially numbered). The indexing is either predefined between the stations of the network, or signalled by the AP in the trigger frame or in a separate control frame. The signalling by the AP may be advantageous if the number of RUs may vary. The indexing may concern only RUs available for random access or all the RUs. If only available RUs are indexed, the mapping between the backoff counter values of the stations and the RUs may translate more easily.

Second, and according to one implementation, if the pending backoff value is not greater than the number of OFDMA sub-channels, the station is allowed to access to the RU indexed by the selected backoff value. Typically, a transmitting station having a pending backoff value of 3 is allowed to send data onto the RU having index 3 (in the context of FIG. 9 for an exemplary OFDMA TXOP of 8 RUs).

As the computation of initial backoff value follows a random procedure according the 802.11 EDCA, then benefit is taken from such randomization for selecting an OFDMA Resource Unit. It is a clear advantage to keep relying on classical random generation resources already present and implemented in commonly known 802.11 hardware. A further advantage is to avoid implementing an additional step of drawing a random number for allocating a RU.

In step 811, the stations 600 which have determined that they are not eligible stations (e.g. each of their pending backoff values is greater than the number of available RUs) will conduct the following step before finishing the algorithm: each non-eligible transmitter station 600 may decrement each of its active backoff value(s) of a value corresponding to the number of RUs inside OFDMA TXOP.

More generally, backoff engines 311 associated with non-eligible transmission queues either belonging to a non-eligible station or to an eligible station, may update their pending backoff value, for example by subtracting the number of available RUs. Alternatively, pending backoff values are updated by subtracting a value, typically lower than the number of available RUs. In a further variant, the pending backoff values are not updated.

Backoff engines 311 associated with eligible transmission queues and selected for serving data for transmission may reset their backoff counter (drawing of new backoff value) if remaining data is still available in the transmission buffer.

Backoff engines 311 associated with eligible transmission queues and not selected for serving data for transmission (collided queues or virtually collided queues) may reset their backoff counter.

If no more data is available for transmission, the corresponding backoff engine is switched to inactive and its backoff value is not taken into account.

Update of the backoff values should occur any time before the transmission opportunity (TXOP) of typically an uplink multiuser transmission ends so that conventional communication will resume using updated backoff values.

Step 812:

The station 600 shall respond to a TF with at least one 802.11 PPDU frame (PPDU means PLOP Protocol Data Unit, with PLOP for Physical Layer Convergence Procedure; basically a PPDU refers to an 802.11 physical frame) in an 802.11ax format after a SIFS period in the so-determined at least one Resource Unit of the OFDMA TXOP.

If the transmitting node estimates that, at the end of the OFDMA RU transmission, there will still have the buffered data to be sent to the destination, then the transmitting node 600 indicates in at least one of the sent MPDUs (typically the last one) this information of having more data to send (typically by setting the "more data field" bit in the Frame Control header (301) of 802.11 MAC frame).

Back to flowchart of FIG. 8a, the TXOP can be terminated by the destination node (AP).

Step 802:

The destination node (like the AP) will send an acknowledgment related to the received MPDUs from multiple users inside the OFDMA TXOP. Preferably, the ACK frame is transmitted in a non-HT duplicate format in each 20 MHz channel covered by the initial TF's reservation. This acknowledgment is necessary for the multiple source nodes 600 to determine if the destination (AP) has well received the OFDMA MPDUs, as the source nodes are not able to detect collisions inside their selected RUs. The source nodes 600 may flush the buffered data that were successfully transmitted (step 813 of flowchart 8b).

The Step 803 is relative to additional embodiments of the invention, and will be described further in regards to FIG. 10.

FIG. 9 illustrates exemplary communication lines resulting from an implementation of the first exemplary embodiment of the invention. An AP sends a trigger frame for random access on an overall exemplary 40 MHz operational band (meaning the TF 430 is duplicated on two 20 MHz channels). This example suggests that the network is configured to handle 4 OFDMA Resource Units per each 20 MHz channel (all stations are aware of this configuration). A total of 8 RUs are thus available over the two 20 MHz channels.

It is assumed in the illustration of FIG. 9 that all the RUs are available for random access and that they are indexed from 1 to 8 (RU#1 to RU#8). Reference 410-2 corresponds to RU#2 and reference 410-4 corresponds to RU#4.

The area 900 indicates the timing of execution of random RU selection according to embodiments of the invention. This corresponds to the steps 810 to 812 of flowchart 8b. Reference 910 indicates the pending backoff value of each transmitter station before the wireless medium was preempted by the AP.

Each station STA1 to STAn is assumed to be a transmitter station with regards to receiving AP, and as a consequence, each station have at least one active backoff engine. For the sake of clear illustration, only one backoff value per station is represented in the figure, but the case of several EDCA backoff values per station can also be supported by embodiments of the invention as stated previously.

The station STA1, executing the algorithm of flowchart 8b, will not consider itself as an eligible station for sending data on a RU of current TXOP because it has a backoff value of 10 which is greater than the maximum number of OFDMA RUs (equals 8).

The station STA2, executing the algorithm of flowchart 8b, will consider itself as an eligible station for sending data on a RU of current TXOP because it has a backoff value of 3 which is lesser than the maximum number of OFDMA RUs. It will send an OFDMA PPDU 230 inside the RU indexed by the backoff value, so the number 3.

The stations STA3 and STA$_{n-1}$, executing the algorithm of flowchart 8b, will consider themselves as eligible stations for sending data on a RU of current TXOP because each one has a backoff value of 4 which is not greater than the maximum number of RUs. Both will send an OFDMA PPDU 230 inside the RU indexed by the backoff value, so the number 4. One may note that two stations will use the same Resource Unit (410-4), thus conducting to a collision. The ACK 240, sent by the AP, is the only means for those stations to be alerted about such event.

One may also note that some Resource Units will not be used (for example RU indexed 2 (410-2), 5, 7 and 8). This is due to the randomization process. In dense environments like 802.11ax standard considers, there would be limited under-usage of RU as there is more chance to have competing stations having a same backoff expiration occurrence.

Figure 13:
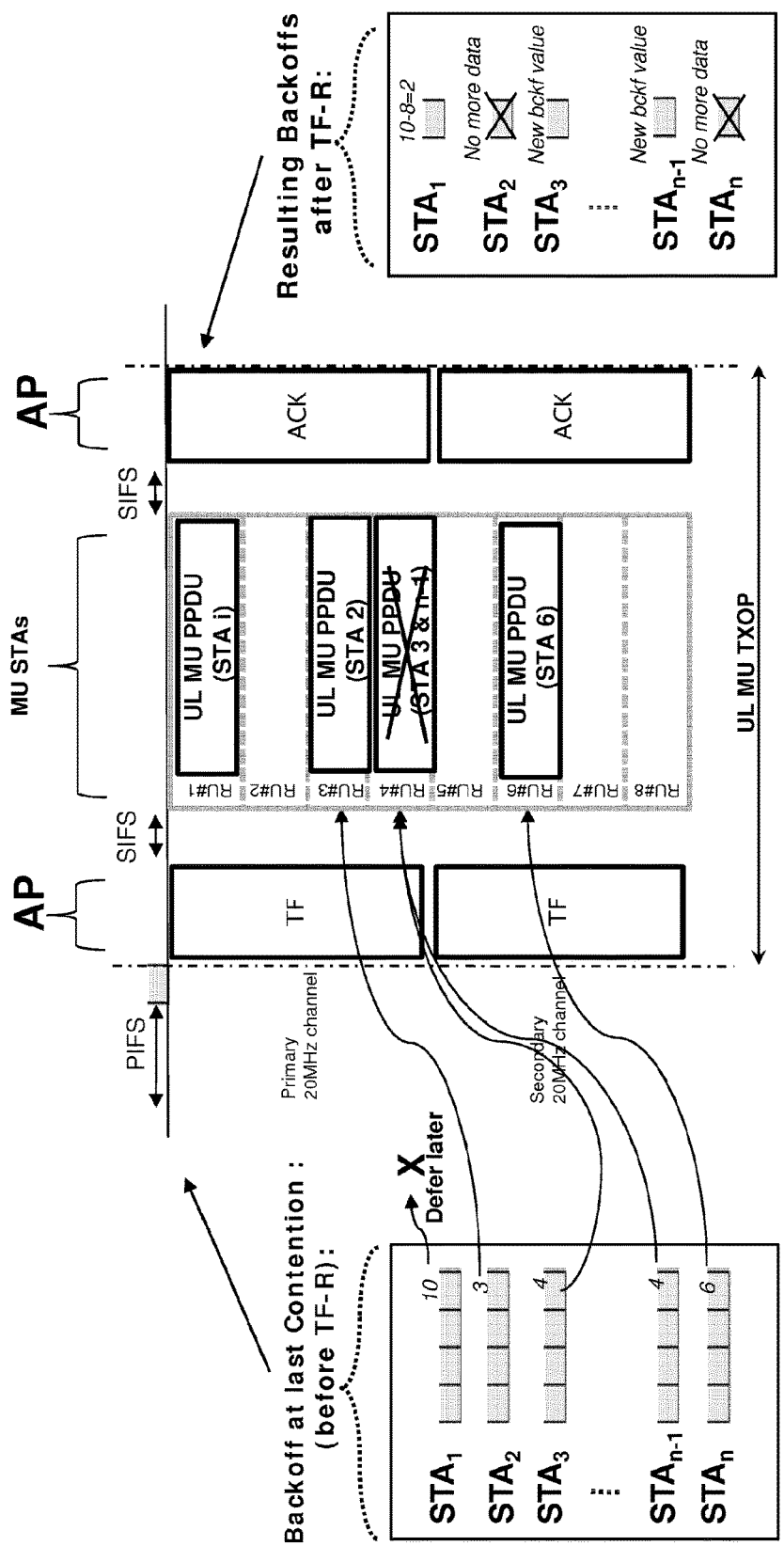

FIG. 13 is an exemplary illustration similar to FIG. 9. In FIG. 13, pending backoff values at the time the trigger frame (of type TF-R) was transmitted and the resulting (updated) backoff values after accessing the RUs are represented. Note that RUs #1 to #4 are sub-divisions of the primary 20 MHz channel and that RUs #5 to #8 are sub-divisions of a secondary 20 MHz channel.

According to first exemplary embodiment of the invention, the multiple stations (STA$_1$ to STA$_n$) use their pending backoff counts as criteria for accessing the UL MU TXOP, and particularly to select a Resource Unit (RU) to be used for the next UL MU TXOP. Due to the random nature of the backoff values, collision may still possibly occur over some RUs, while other RUs may remain free. The scenario of the figure is chosen to illustrate these possibilities.

Upon receiving a TF-R, the stations analyze if they are eligible to access a RU:

the current (pending) backoff count is tested if it fits in the number of available RUs (for example, backoff value <Nb of random RU defined by the TF-R); and an eligible station may transmit inside the RU corresponding to its backoff value (for example, RU index=backoff value) and redraws its backoff value after that if further data needs to be transmitted.

In one implementation, at the UL MU TXOP end, all other (non-eligible) 802.11ax stations should have updated their backoff counts (e.g. decrease their backoff counts by the number of available RUs specified in TF-R; for instance, for station STA1, pending backoff value 10 is reduced by 8 which is the number of available RUs in this example).

The proposed solution is fully distributed and is advantageous since there is no need to perform a specific random computation for TF-R (backoff is already randomly generated), it is 802.11 standard compliant (EDCA priority is kept), and collisions occurring over RUs are limited to 802.11ax stations (implementing the embodiments of the invention) and not involving legacy stations. Also, the proposed station-eligibility procedure reduces the probability of RU collisions.

Figure 10:
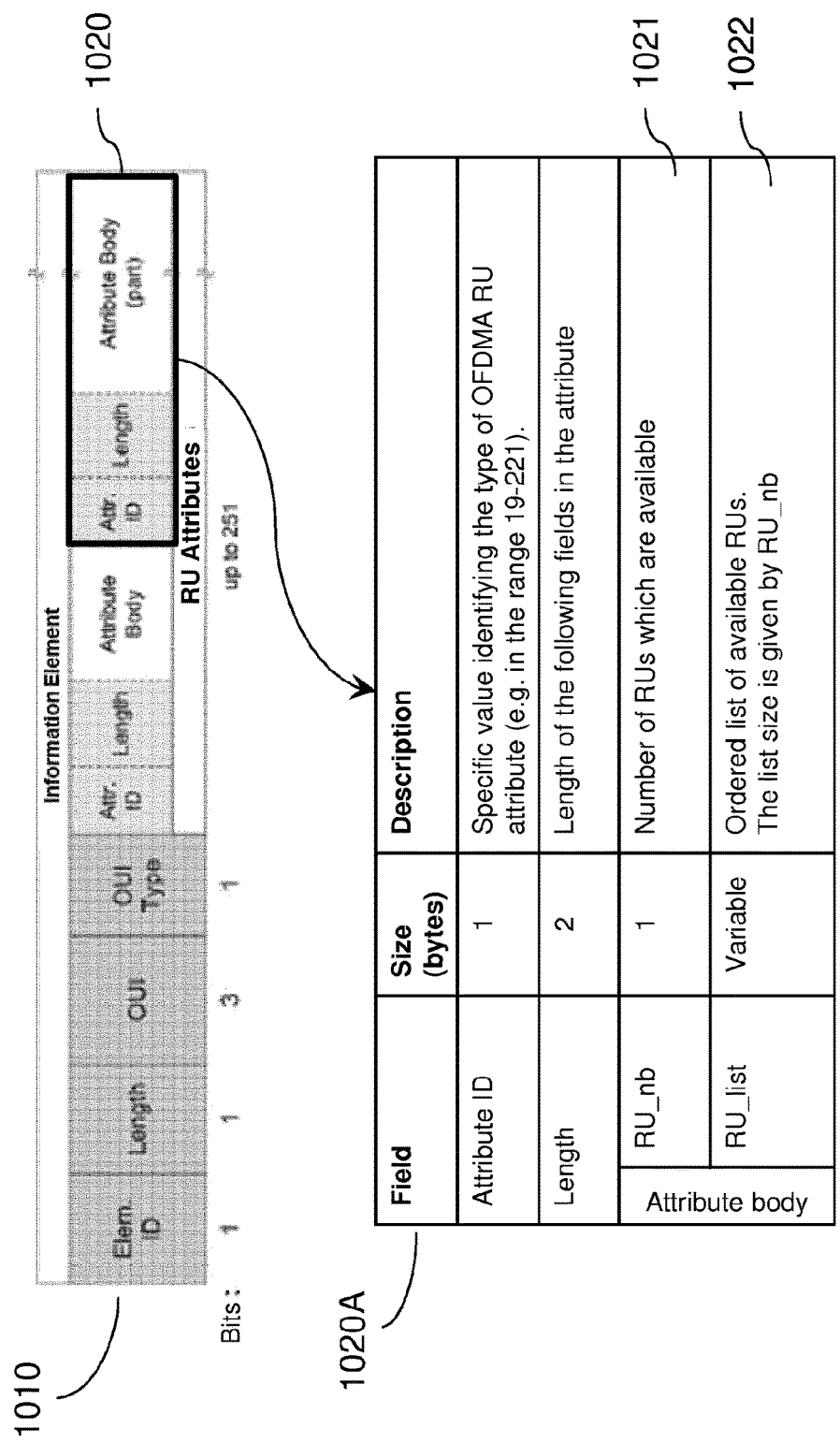

FIG. 10 presents the format of a 'RU Information Element' (1010), which may be used in the first and second exemplary embodiments of the present invention.

The 'RU Information Element' (1010) may be used by the AP to embed additional information inside the random trigger frame (TF-R) related to the OFDMA TXOP. Its format follows the 'Vendor Specific information element' format as defined in IEEE 802.11-2007 standard. The 'RU Information Element' (RU IE, 1010) is a container of one or several RU attributes (1020), having each a dedicated attribute ID for identification. The header of RU IE can be standardized (and thus easily identified by stations) through the Element ID, OUI, OUI Type values.

The RU attributes 1020 are defined to have a common general format consisting of a one-byte RU Attribute ID field, a two-byte Length field and variable length attribute specific information fields.

The usage of Information Element inside the MAC frame payload is given for illustration only, any other format may be supported.

As a variant, the RU attribute body (further referenced by comprising elements from 1021 to 1023 according to FIGS. 10 and 11) may be directly located in the frame body field 302 of the trigger frame.

The choice of embedding additional information in the MAC payload is advantageous for keeping legacy compliancy with the medium access mechanism, because any modification performed inside the PHY header of the 802.11 frame would have inhibited any successful decoding of the MAC header (the Duration field would not have been decode, so the NAV would not have been set by legacy devices).

As a result, the trigger frame is advantageously compatible with various transmission widths according 802.11 standard. As an example, the transmission width is a multiple of legacy 20 MHz width (this is the case when the TF follows the 802.11a non-HT duplicated format according to FIG. 5a; in another exemplary case, the TF may alternatively use a bandwidth formed of at least one 20 MHz channel in a TXOP granted by at least one 802.11a control frame). As another example, the TF may be transmitted with a lower width (less than 20 MHz): as example, the AP can transmit the TF inside a RU sub-channel of a downlink OFDMA TXOP.

Although not limited in this respect, one way to implement the random RU allocation is described hereafter based on said IE formats.

In a first implementation, the trigger frame contains a list of available RUs for random access.

To do so, the TF contains a specific information element 1010 in the frame body 302 of the 802.11 MAC frame, which contains the RU attribute 1020A according to FIG. 10.

As shown in the Figure, a dedicated RU attribute for the 'RU List Info' attribute (1020A) follows the following format:

The Attribute ID is a dedicated value identifying the 'RU List Info'. A value unused in the standard, e.g. in the range 19-221, may be selected. This one-byte value is a tag starting the 'RU List Info'.

RU nb (1021) gives the number of Resource Units which are available for usage. This number also gives the number of entries in the next field.

RU list (1022), is the list of RU indexes supporting the random allocation for the current OFDMA TXOP.

A variant (not shown in the figure) may consist in describing the channel specificities of each RU, that is to say the frequencies bounding each (available) OFDMA Resource Unit. This is in case the OFDMA granularity map is not known by a source station joining the BSS owned by the AP.

Thus, the behavior of step 811 performed by source station(s) 600 may be implementation as follows for performing the random RU allocation:

an eligible station is determined through a counter backoff less that the number of available RUs (given by RU_nb 1021);

the RU slot is selected through its index in the list RU_list 1022.

In a second implementation, based on the first implementation, the trigger frame also contains a list of scheduled RUs in addition of those for random access.

FIG. 11 presents this other format (1020B) for the 'RU Access Info' attribute. An attribute ID may be assigned to that format and may be different from the 1020A's one.

A list of scheduled RU (1023) is provided by the AP in the trigger frame, wherein each scheduled RU is allocated to a given station (already registered to the AP) identified by its 'Association Identifier' (or 'AID' according 802.11 standard).

This implementation is advantageous for mixing scheduled and random communications from multiple source stations, which are triggered by a single TF.

A variant (not shown in the figure) may consist in describing a list of RU (similar to 1023) comprising all the RUs (that is to say both random and scheduled types), wherein a RU with an associated AID set to 0 indicates that this RU is of random type. In that case, 1021 and 1022 may not be required.

The random RU allocation procedure concerning the behavior of step 811 described here above for the first implementation is still applicable.

This second implementation is advantageous when a source station indicates that it has still data to send as explained in step 812: the AP may react to that notification through the step 803, wherein it prepares the next OFDMA TXOP's profile: it may schedule for that source station 600 a fixed RU slot inside the scheduled list 1023 (instead of letting the source fighting to randomly obtain a random Resource Units).

In a further implementation of step 803, the AP may adjust the number of random RUs compared to the scheduled RUs for next attempts in consideration of various elements, which may be (without limitation):

the number of registered/detected stations inside the wireless cell;

the detected collisions seen by the AP: for example, the number of collided random RUs in past OFDMA TXOPs;

the smooth increase/decrease of unicast communications in direction to the AP.

As one can note, the various alternative embodiments presented in FIGS. 10 and 11 are compatible one with each other, and may be combined to take advantage of their respective advantages.

As a variant of the random allocation procedure, the total number of RUs composing the OFDMA TXOP are all still considered for selection based on backoff value (even if some RU slots are indicated as reserved through 1023 for scheduled RUs). Pending backoff values are thus mapped to all RUs and not only to RUs available for random access.

Thus, in a variant implementation of step 811, an eligible station still needs to have its backoff count lesser than the total number of RUs, however if the backoff count is lower than the total number of RUs, but points to a position of a scheduled RU from list 1023, then the eligible station defers it access (as if there is a virtual collision).

In a second variant, said eligible station which falls into an occupied RU slot may select the nearest (as example+1 or −1) available RU from random list 1021.

A second exemplary embodiment is based on the first exemplary embodiment with all its variants wherein the eligibility is determined by comparing the pending backoff values to a threshold value instead of the number of available RUs.

In this second embodiment, backoff engines 311 associated with non-eligible transmission queues (either belonging to a non-eligible station or to an eligible station), may update their pending backoff value by subtracting the threshold value. Alternatively, the pending backoff is not updated.

A third exemplary embodiment is based on the first or second exemplary embodiments with all their variants wherein the behavior of step 811 performed by source station(s) 600 is modified such that the eligible stations are not limited to those having a pending backoff value lesser than the available RU slots. Thus, all source stations having pending data in direction to the receiving station (e.g. the AP) can randomly select a RU slot: in the present case, the backoff value for determining the RU index (RU_index) must fit into the number of available RUs (1021).

So, if backoff value is greater than the number of random RU slots, the RU_index may be the remainder of the Euclidean division of backoff value by the maximum available RU slots:

$$RU\_index = backoff\_value \bmod RU\_nb$$

wherein 'mod' is the modulo operation.

More generally, any mapping between the backoff_value and the RU_index can be applied. Increasing the number of eligible stations reduces the probably to have empty RUs but increases the risk of collisions. Choosing the number of available RUs as a threshold for deciding about eligibility of stations is one possible implementation, but this threshold can be increased or reduced to define a tradeoff between unused RUs and collisions for better bandwidth usage efficiency.

A fourth exemplary embodiment is based on the first or second exemplary embodiments with all their variants wherein the behavior of step 811 performed by source station(s) 600 is modified such that the index of the RU over which the access is performed is determined by a process not dependent on the pending backoff values (e.g. an additional random process). In this embodiment, advantage is brought by applying the eligibility criteria to the transmission queues for reducing the number of candidates for contention and hence collisions as discussed above.

Figure 12:
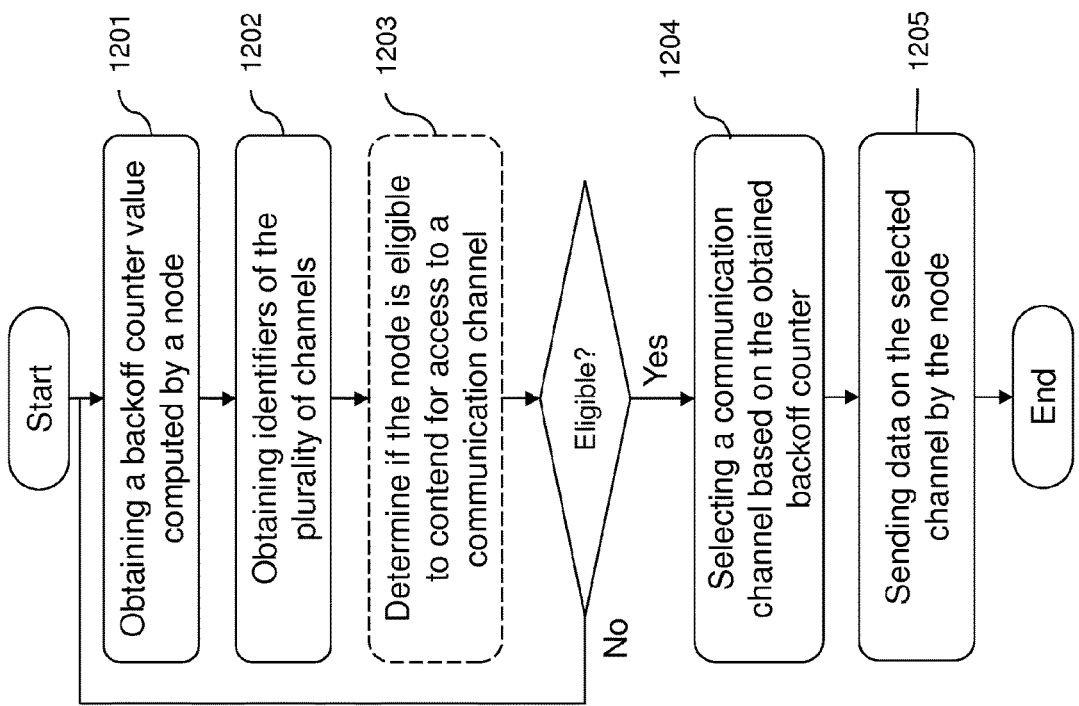
FIG. 12 illustrates the behaviour of a source node 600 for contending access to a communication channel according to another exemplary embodiment of the invention.

More generally, flowchart of FIG. 12 illustrates the behaviour of a source node 600 for contending access to a communication channel according to embodiments of the invention.

The source node implements a medium access mechanism with collision avoidance based on a computation of backoff values. A backoff counter value corresponds in one of its aspects to a number of time-slots the node waits, after the communication medium has been detected to be idle, before accessing the medium. Other aspects of the backoff counter usage according to embodiments of the invention are detailed herebelow.

The communication channel may be any communication resource among a plurality of resources of the wireless network shared in time and/or frequency over which nodes may contend for access. The communication channel may be a resource unit (sub-channel), a 20 MHz channel or any part of the composite channel. The channels may be multiplexed in frequency (OFDMA), in time (TDMA) or in any combination of time and frequency.

At 1201, at least one backoff counter value computed by the node is obtained. At 1202, identifiers of the plurality of communication channels are obtained. The identifiers may be indexes obtained out of an indexing process of the communication channels. The identifiers may also be sequence numbers associated with the communication channels. Preferably, only channels that are available for random access are indexed. This allows to make an easy one-to-one mapping for example between a backoff counter value and the identifier (index) of one channel (cf. step 1204). The identifiers may be generated locally according to a process known to the nodes of the wireless network or communicated by the AP.

Optionally, the obtained backoff value is used to determine if the node is eligible to contend access to a communication channel. Typically, a backoff value which has no corresponding channel identifier to map into may cause the node which computed that backoff value to be considered as not eligible.

In a simple implementation, the computed backoff value should be not greater than the highest index of the communication in order for the node to be eligible.

In a variant where the selection step 1204 is not based on a one-to-one mapping for example between a backoff counter value and the identifier (index) of one channel, a different eligibility determination may be performed: for example, a reference backoff value (threshold value) may have been specified by the node granting the medium access (for example embedded in the trigger frame 430), and this reference is considered by source node 600 as a maximum threshold for its local backoff values in order to determine itself as an eligible node.

If the node is tested as eligible, the method continues with the steps 1204 and 1205. Otherwise, the flowchart is re-executed when a new backoff counter value is computed.

If the step 1203 is not implemented, the steps 1204 and 1205 are executed after the step 1202. This is for example the case when all the nodes are by default eligible thanks to the implementation of a mapping between all possible values of the backoff counter and the identifiers of the available communication channels. This mapping may be implemented by a modulo function as described above.

At 1204, a communication channel is selected among the plurality of communication channels based on the obtained backoff counter value. In one implementation where each channel is associated with a sequence number, the selected channel has an associated sequence number equal to the obtained backoff counter. In an alternate embodiment, a communication channel is selected among the plurality of communication channels using a process not dependent on the backoff value used for deciding about the eligibility of the node, such as a random process relying on the drawing of independent random values or a deterministic process.

At 1205, the node contends access on the selected channel by sending a data frame on that channel.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A wireless communication method in a wireless network comprising an access point and a plurality of nodes, the method comprising the following steps, at one of the nodes:
   receiving a trigger frame from the access point, the trigger frame reserving a transmission opportunity on a 20 MHz channel, the reserved 20 MHz channel being split into OFDMA resource units in the frequency domain including one or more random OFDMA resource units the nodes can access using a contention scheme;
   obtaining a random backoff value that the node initializes;
   comparing the backoff value to a threshold value which is based on a number of the one or more random OFDMA resource units;
   determining if the node is eligible to contend for access on the one or more random OFDMA resource units based on the result of the comparing; and
   transmitting data on one or more of the one or more random OFDMA resource units if the node is determined to be eligible.

2. The wireless communication method of claim 1, wherein the node is eligible to contend for access if the random backoff value is not greater than the threshold value.

3. The wireless communication method of claim 1, wherein the threshold value is received from the access point.

4. The wireless communication method of claim 3, wherein the threshold value is included in the trigger frame.

5. The wireless communication method of claim 1, wherein the node comprises a plurality of transmission queues for serving data at different priorities.

6. The wireless communication method of claim 5, wherein the steps of obtaining a random backoff value and comparing the backoff value to a threshold value are executed for each transmission queue,
   and wherein a queue is eligible to serve data depending on the result of comparing the random backoff value associated with the queue with the threshold value.

7. The wireless communication method of claim 6, wherein a queue is eligible to serve data if the random backoff value associated with the queue is not greater than the threshold value.

8. The wireless communication method of claim 6, wherein the node is eligible to contend for access if at least one of its queues is eligible to serve data.

9. The wireless communication method of claim 6, wherein if a plurality of queues are eligible to serve data, one queue is selected among the plurality of eligible queues for serving data to be transmitted on the random OFDMA resource unit in the transmitting step.

10. The wireless communication method of claim 6, wherein if a plurality of queues are eligible to serve data and the node is capable of transmitting data over a plurality of transmission opportunities on one or more random OFDMA resource units, a plurality of eligible queues are selected for serving data to be transmitted on one or more random OFDMA resource units in the transmitting step.

11. The wireless communication method of claim 9, wherein the selection of one eligible queue is based on the traffic priority associated with the queue or queues or on the random backoff value(s) obtained for the queue or queues.

12. The wireless communication method of claim 1, wherein the random OFDMA resource unit on which data is transmitted is selected among a plurality of random OFDMA resource units the nodes can access using a contention scheme based on the obtained random backoff value.

13. The wireless communication method of claim 1, wherein the random OFDMA resource unit is a resource unit resulting from the division of a 20 MHz channel into OFDMA sub-channels.

14. The wireless communication method of claim 1, wherein the trigger frame is received from the access point and wherein the data is transmitted at the transmitting step to the access point.

15. The wireless communication method of claim 1, wherein the random backoff value is the number of 802.11 time-slots the node must wait when a medium is sensed idle before the node grants itself a transmission opportunity (TXOP).

16. The wireless communication method of claim 1, further comprising a step of updating a random backoff value by subtracting the number of random OFDMA resource units to be used for a next data transmission.

17. A communication device in a wireless network comprising an access point and a plurality of nodes, the communication device being one of the nodes and comprising:
   means for receiving a trigger frame from the access point, the trigger frame reserving a transmission opportunity on a 20 MHz channel, the reserved 20 MHz channel being split into OFDMA resource units in the frequency domain including one or more random OFDMA resource units the nodes can access using a contention scheme;

means for obtaining a random backoff value that the node initializes;

means for comparing the backoff value to a threshold value which is based on a number of the one or more random OFDMA resource units;

means for determining if the node is eligible to contend for access on the one or more random OFDMA resource units based on the result of the comparing; and means for transmitting data on one or more of the one or more random OFDMA resource units if the node is determined to be eligible.

18. A wireless communication system having an access point and at least one node according to claim 17.

19. A non-transitory computer-readable medium storing a program which, when executed by a microprocessor or computer system in a device of a wireless network, causes the device to perform the method of claim 1.

* * * * *